(12) United States Patent
Boewe et al.

(10) Patent No.: US 7,089,738 B1
(45) Date of Patent: Aug. 15, 2006

(54) SYSTEM FOR CONTROLLING TURBOCHARGER COMPRESSOR SURGE

(75) Inventors: Daniel E. Boewe, Columbus, IN (US); Danny R. Baker, Columbus, IN (US); Philip M. Dimpelfeld, Columbus, IN (US); David A. Vittorio, Columbus, IN (US); Thomas A. Grana, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/102,271

(22) Filed: Apr. 9, 2005

(51) Int. Cl.
*F02B 33/44* (2006.01)
*F02M 25/07* (2006.01)
*G06F 17/00* (2006.01)

(52) U.S. Cl. .................. 60/605.2; 60/602; 60/608; 123/568.21; 701/108

(58) Field of Classification Search .............. 60/597, 60/600, 691, 602, 605.1, 605.2, 606, 608, 60/612, 614, 615; 123/568.11, 568.12, 568.21; 701/108
See application file for complete search history.

(56) References Cited

U.S. PATENT DOCUMENTS

| | | | | |
|---|---|---|---|---|
| 3,996,748 A * | 12/1976 | Melchior | ................. | 60/614 |
| 4,949,276 A | 8/1990 | Staroselsky et al. | | |
| 5,207,063 A | 5/1993 | Blake | ................. | 60/612 |
| 5,594,665 A | 1/1997 | Walter et al. | | |
| 5,683,223 A | 11/1997 | Harada et al. | ................. | 415/17 |
| 6,105,555 A | 8/2000 | Weber et al. | ................. | 123/493 |
| 6,298,718 B1 | 10/2001 | Wang | ................. | 73/118.1 |
| 6,317,655 B1 | 11/2001 | Khots et al. | ................. | 700/275 |
| 6,324,848 B1 * | 12/2001 | Gladden et al. | ................. | 60/612 |
| 6,408,624 B1 | 6/2002 | Books et al. | ................. | 60/601 |
| 6,553,764 B1 * | 4/2003 | Gladden et al. | ................. | 60/608 |
| 6,918,251 B1 * | 7/2005 | Yanagisawa et al. | ................. | 60/605.2 |
| 6,964,256 B1 * | 11/2005 | Kataoka et al. | ................. | 123/568.21 |
| 2001/0035171 A1 | 11/2001 | Kim et al. | ................. | 123/568.12 |
| 2003/0230276 A1 * | 12/2003 | Kataoka et al. | ................. | 123/568.21 |
| 2004/0194463 A1 * | 10/2004 | Yanagisawa et al. | ................. | 60/605.2 |
| 2005/0188693 A1 * | 9/2005 | Schmid et al. | ................. | 60/605.2 |
| 2005/0188695 A1 * | 9/2005 | Shirakawa | ................. | 60/605.2 |
| 2006/0016187 A1 * | 1/2006 | Swenson et al. | ................. | 60/605.2 |
| 2006/0021347 A1 * | 2/2006 | Sun et al. | ................. | 60/612 |

* cited by examiner

*Primary Examiner*—Willis R. Wolfe, Jr.
(74) *Attorney, Agent, or Firm*—Barnes & Thornburg LLP

(57) ABSTRACT

A system for controlling turbocharger compressor surge includes a turbocharger compressor fluidly coupled to an engine intake manifold, an exhaust gas recirculation (EGR) valve disposed in-line with an EGR conduit fluidly coupled between the engine intake and exhaust manifolds, means for determining a mass flow parameter, a speed sensor producing a speed signal indicative of turbocharger speed, and a control computer configured to determine a mass flow rate surge value, corresponding to a fresh air mass flow rate above which turbocharger compressor surge is avoided, as a function of the speed signal, and to limit the EGR valve position and VGT position as a function of the mass flow parameter and the mass flow rate surge value to maintain exhaust gas flow through the EGR valve at a flow rate below which turbocharger compressor surge is avoided.

20 Claims, 9 Drawing Sheets

SYSTEM FOR CONTROLLING TURBOCHARGER COMPRESSOR SURGE

FIELD OF THE INVENTION

The present invention relates generally to systems for controlling turbocharged internal combustion engines, and more specifically to systems for controlling turbocharger compressor surge.

BACKGROUND OF THE INVENTION

Turbocharging machinery is well-known and commonly used in the internal combustion engine industry to pressurize intake air entering the engine combustion chambers and thereby increase the efficiency and power output of the engine. In general, pressurizing the intake air increases the quantity of air entering the engine cylinders during the intake stroke, and this allows more fuel to be utilized in establishing a desired air/fuel ratio. Increased available engine output torque and power thereby results.

Conventional turbochargers for internal combustion engines include a turbine disposed in the path of exhaust gas exiting the engine exhaust manifold, wherein the turbine typically includes a wheel that is rotated via the flow of exhaust gas thereby. The turbine wheel is rotatably coupled to a wheel of a compressor disposed in-line with the air intake system of the engine. Rotation of the turbine by the exhaust gas flow causes the compressor wheel to likewise rotate, wherein rotation of the compressor wheel acts to increase the flow of fresh air to, and consequently the air pressure within, the air intake system. Generally, the rotational speed of the turbocharger turbine and compressor wheels, and hence the air pressure within the air intake system, is proportional to the flow rate of exhaust gas, which is itself proportional to engine speed.

In the operation of turbochargers of the type just described, a condition known as turbocharger compressor surge is known to occur under certain engine and air handling system operation. Generally, turbocharger compressor surge occurs when the accumulated pressure in the intake manifold exceeds the ability of the compressor to sustain positive air movement. When this occurs, intake manifold air pressure decreases by an amount generally proportional to the intensity of the surge condition.

A number of engine and air handling system conditions contribute to, and define, turbocharger compressor surge including, for example, engine speed, engine fueling rate, turbocharger speed, mass flow rate of intake air, intake manifold pressure, intake manifold volume, intake manifold temperature, and the like. In engines including exhaust gas recirculation systems, another engine operating parameter that impacts and defines turbocharger compressor surge is the flow rate of exhaust gas recirculated to the intake manifold, which affects the mass flow rate of intake air and intake manifold pressure. What is therefore needed is a system for monitoring EGR flow rate, or alternatively the EGR fraction, which is the fraction of recirculated exhaust gas relative to the total air charge entering the intake manifold, and to control such EGR flow rate or EGR fraction in a manner that avoids turbocharger compressor surge.

SUMMARY OF THE INVENTION

The present invention may comprise one or more of the following features and combinations thereof. A system for controlling turbocharger compressor surge may comprise an internal combustion engine having intake and exhaust manifolds, a turbocharger including a compressor having an inlet fluidly coupled to ambient and an outlet fluidly coupled to the intake manifold, an exhaust gas recirculation (EGR) valve disposed in-line with an EGR conduit fluidly coupled between the intake and exhaust manifolds, the EGR valve responsive to an EGR valve control signal to control exhaust gas flow therethrough, means for determining a mass flow rate parameter corresponding to a mass flow rate of air supplied to the intake manifold, a speed sensor producing a speed signal indicative of turbocharger speed, and a control computer. The control computer may be configured to determine a mass flow rate surge value, corresponding to a fresh air mass flow rate above which turbocharger compressor surge is avoided, as a function of the speed signal, and to limit the EGR valve control signal as a function of the mass flow rate parameter and the mass flow rate surge value to maintain exhaust gas flow through the EGR valve at a flow rate below which the turbocharger compressor surge is avoided.

In one embodiment, the mass flow rate parameter may correspond to a mass flow rate of fresh air supplied by the compressor to the intake manifold, and in this embodiment the control computer may be configured to determine a flow ratio as a ratio of the mass flow rate surge value and the mass flow rate of fresh air, and the control computer may limit the EGR valve control signal as a function of the flow ratio. The control computer in this embodiment may include means for producing an EGR fraction command corresponding to a desired fraction of recirculated exhaust gas relative to an air charge supplied to the intake manifold, the air charge being a combination of recirculated exhaust gas and fresh air, means responsive to the EGR fraction command and the flow ratio to produce a limited EGR fraction command corresponding to an EGR fraction below which turbocharger compressor surge is avoided, and means responsive to the limited EGR fraction command to produce the EGR valve control signal. The control computer may further be configured in this embodiment to determine a mass flow rate surge limit, corresponding to a fresh air mass flow rate greater than the mass flow rate surge value, as a function of the speed signal, and the control computer may be configured to determine the flow ratio further as a function of the mass flow rate surge limit. The control computer may further be configured to determine a surge limit percentage as a sum of one and a ratio of the mass flow rate surge limit and one hundred, and the control computer may be configured to compute a mass flow rate limit as a product of the mass flow rate surge value and the surge limit percentage and to determine the flow ratio as a ratio of the mass flow rate limit and of the mass flow of fresh air.

Alternatively, the control computer may include means for producing an EGR fraction command corresponding to a desired fraction of recirculated exhaust gas relative to an air charge supplied to the intake manifold, the air charge being a combination of recirculated exhaust gas and fresh air, means responsive to the EGR fraction command to produce the EGR valve control signal, means for determining a charge flow value corresponding to a mass flow rate of the air charge, and means for limiting the EGR valve control signal as a function of the flow ratio and of the charge flow value to maintain exhaust gas flow through the EGR valve at the flow rate below which the turbocharger compressor surge is avoided. In this embodiment, the means for limiting the EGR valve control signal may include means for determining a reduction value as a function of the flow ratio and the charge flow value, the reduction value corresponding to an amount of reduction of the exhaust gas flow through the EGR valve required to maintain exhaust gas flow therethrough at the flow rate below which the turbocharger compressor surge is avoided, and means for limiting the EGR valve control signal as a function of the reduction value and the EGR valve control signal only if the flow ratio is greater than or equal to a predefined ration value. The control computer may further be configured in this embodiment to determine a mass flow rate surge limit, corresponding to a fresh air mass flow rate greater than the mass flow rate surge value, as a function of the speed signal, and the control computer may be configured to determine the flow ratio further as a function of the mass flow rate surge limit. The control computer may further be configured to determine a surge limit percentage as a sum of one and a ratio of the mass flow rate surge limit and one hundred, and the control computer may be configured to compute a mass flow rate limit as a product of the mass flow rate surge value and the surge limit percentage and to determine the flow ratio as a ratio of the mass flow rate limit and of the mass flow of fresh air.

In an alternate embodiment, the mass flow rate parameter may be a charge flow value corresponding to a mass flow rate of a combination of fresh air supplied to the intake manifold via the compressor and recirculated exhaust gas supplied to the intake manifold via the EGR valve, and the control computer may be configured in this embodiment to limit the EGR valve control signal as a function of the mass flow rate surge value and the charge flow value. The control computer in this embodiment may include means for producing an EGR fraction command corresponding to a desired fraction of recirculated exhaust gas relative to an air charge supplied to the intake manifold, the air charge being the combination of fresh air and recirculated exhaust gas, means for determining a maximum EGR fraction value as a function of the mass flow rate surge value and the charge flow value, the maximum EGR fraction value corresponding to an EGR fraction below which the turbocharger compressor surge is avoided, means for producing a limited EGR fraction command as a function of the EGR fraction command and the maximum EGR fraction value, and means responsive to the limited EGR fraction command to produce the EGR valve control signal. The means for determining a maximum EGR fraction value may include means for computing a maximum EGR flow rate value as the charge flow value less the mass flow rate surge value, and means for computing the maximum EGR fraction value as a function of the maximum EGR flow rate value. The control computer may further be configured to determine a mass flow rate surge limit, corresponding to a fresh air mass flow rate greater than the mass flow rate surge value, as a function of the speed signal, and to determine the flow ratio further as a function of the mass flow rate surge limit. The control computer may further be configured to determine a surge limit percentage as a sum of one and a ratio of the mass flow rate surge limit and one hundred, and to compute a mass flow rate limit as a product of the mass flow rate surge value and the surge limit percentage and to determine the flow ratio as a ratio of the mass flow rate limit and of the mass flow of fresh air.

Alternatively, the control computer may include means for determining a reduction value as a function of the mass flow rate surge value and the charge flow value, the reduction value corresponding to an amount of reduction of the exhaust gas flow through the EGR valve required to maintain exhaust gas flow therethrough at the flow rate below which the turbocharger compressor surge is avoided, and means for limiting the EGR valve control signal as a function of the reduction value and of the EGR valve control signal. The control computer may further be configured to determine a mass flow rate surge limit, corresponding to a fresh air mass flow rate greater than the mass flow rate surge value, as a function of the speed signal, and to determine the flow ratio further as a function of the mass flow rate surge limit. The control computer may further still be configured to determine a surge limit percentage as a sum of one and a ratio of the mass flow rate surge limit and one hundred, and to compute a mass flow rate limit as a product of the mass flow rate surge value and the surge limit percentage and to determine the flow ratio as a ratio of the mass flow rate limit and of the mass flow of fresh air.

These and other objects of the present invention will become more apparent from the following description of the illustrative embodiments.

DESCRIPTION OF THE ILLUSTRATIVE EMBODIMENTS

Figure 1:
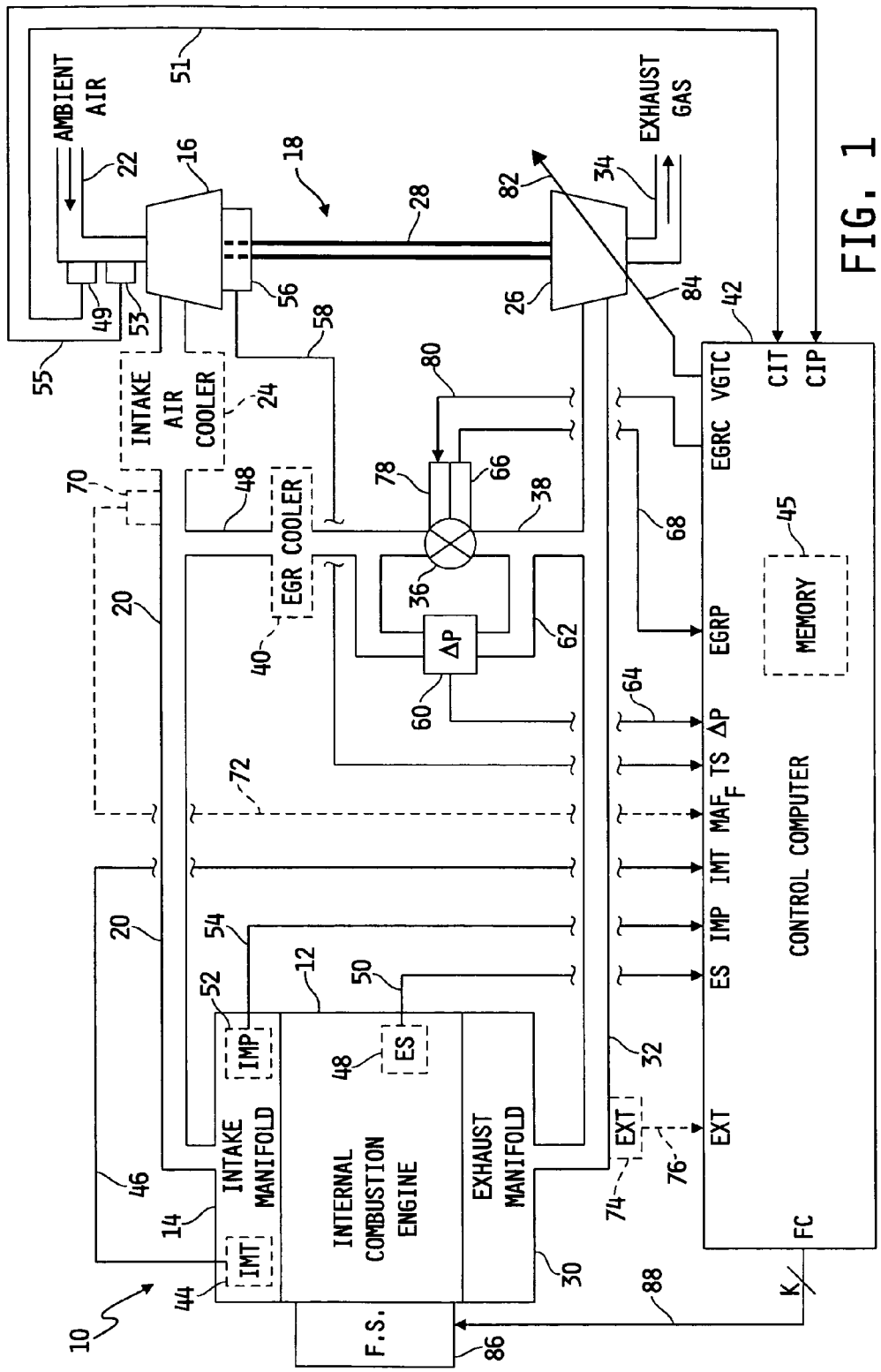
FIG. 1 is a diagram of one illustrative embodiment of a system for controlling turbocharger compressor surge.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring now to FIG. 1, a diagram of one illustrative embodiment of a system 10 for controlling turbocharger compressor surge in a turbocharged internal combustion engine is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh ambient air therefrom. Optionally, as shown in phantom in FIG. 1, system 10 may include an intake air cooler 24 of known construction disposed in-line with intake conduit 20 between the turbocharger compressor 16 and the intake manifold 14. The turbocharger compressor 16 is mechanically and rotatably coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for controlling turbocharger compressor surge.

Control computer 42 includes a number of inputs for receiving signals from various sensors or sensing systems associated with system 10. For example, system 10 includes an intake manifold temperature sensor 44 disposed in fluid communication with the intake manifold 14 of engine 12, and electrically connected to an intake manifold temperature input, IMT, of control computer 42 via signal path 46. Intake manifold temperature sensor 44 may be of known construction, and is operable to produce a temperature signal on signal path 46 indicative of the temperature of air charge flowing into the intake manifold 14, wherein the air charge flowing into the intake manifold 14 is generally made up of fresh air supplied by the turbocharger compressor 16 combined with recirculated exhaust gas that is controllably routed to the intake manifold 14 via EGR valve 36.

System 10 further includes an engine speed sensor 48 electrically connected to an engine speed input, ES, of control computer 42 via signal path 50. Engine speed sensor 48 is operable to sense rotational speed of the engine 12 and produce a corresponding engine speed signal on signal path 50 indicative of engine rotational speed. In one embodiment, sensor 48 is a Hall effect sensor operable to determine engine speed by sensing passage thereby of a number of equi-angularly spaced teeth formed on a gear or tone wheel. Alternatively, engine speed sensor 48 may be any other known sensor operable as just described including, but not limited to, a variable reluctance sensor or the like.

System 10 further includes a compressor inlet temperature sensor 49 disposed in fluid communication with the fresh air intake conduit 22 adjacent to the fresh air inlet of the compressor 16 and electrically connected to a compressor inlet temperature input, CIT, of control computer 42 via signal path 51. Temperature sensor 49 may be of known construction, and is operable to produce a temperature signal on signal path 51 indicative of the temperature of fresh air entering the inlet of the compressor 16.

System 10 further includes a compressor inlet pressure sensor 53 disposed in fluid communication with the fresh air intake conduit 22 adjacent to the fresh air inlet of the compressor 16 and electrically connected to a compressor inlet pressure input, CIP, of control computer 42 via signal path 55. Pressure sensor 53 may be of known construction, and is operable to produce a pressure signal on signal path 55 indicative of the pressure of fresh air entering the inlet of the compressor 16.

System 10 further includes an intake manifold pressure sensor 52 disposed in fluid communication with intake manifold 14 and electrically connected to an intake manifold pressure input, IMP, of control computer 42 via signal path 54. Alternatively, pressure sensor 52 may be disposed in fluid communication with intake conduit 20. In any case, pressure sensor 52 may be of known construction, and is operable to produce a pressure signal on signal path 54 indicative of the pressure within intake conduit 20 and intake manifold 14.

System 10 further includes a speed sensor 56 that is preferably disposed about, or in proximity with, the turbocharger drive shaft 28 and electrically connected to a turbocharger speed input, TS, of engine controller 42 via signal path 58. Sensor 56 may be of known construction and is generally operable to produce a turbocharger speed signal (TS) on signal path 58 that is indicative of the rotational speed of the turbocharger drive shaft 28. In one embodiment, sensor 56 is a variable reluctance sensor operable to determine turbocharger rotational speed by sensing passage thereby of one or more detectable structures formed on shaft 28. Alternatively, turbocharger speed sensor 56 may be any other known sensor operable as just described and suitably located relative to turbocharger drive shaft 28.

System 10 further includes a differential pressure sensor, or $\Delta P$ sensor, 60 fluidly coupled at one end to EGR conduit 38 adjacent to an exhaust gas inlet of EGR valve 36, and fluidly coupled at its opposite end to EGR conduit 38 adjacent to an exhaust gas outlet of EGR valve 36, via bypass conduit 62. Alternatively, the $\Delta P$ sensor 60 may be coupled across another flow restriction mechanism disposed in-line with EGR conduit 38. In any case, the $\Delta P$ sensor 60 may be of known construction and is electrically connected to a $\Delta P$ input of control computer 42 via signal path 64. The $\Delta P$ sensor 60 is operable to provide a differential pressure signal on signal path 64 indicative of the pressure differential across EGR valve 36 or other flow restriction mechanism as just described.

Optionally, as shown in phantom in FIG. 1, system 10 may include a mass flow sensor 70 disposed in fluid communication with intake conduit 20 upstream of the junction of intake conduit 20 with the EGR conduit 38, and electrically connected to a fresh air mass flow rate input, $MAF_F$, of control computer 42 via signal path 72. Mass flow sensor 70 may be of known construction, and is operable to produce a mass flow signal on signal path 72 indicative of the mass flow rate of fresh air entering intake conduit 20 via the turbocharger compressor 16.

System 10 may further optionally include an engine exhaust temperature sensor 74 disposed in fluid communication with exhaust conduit 32 and electrically connected to an engine exhaust temperature input, EXT, of control computer 42 via signal path 76, as shown in phantom in FIG. 1. Alternatively, sensor 74 may be disposed in fluid communication with the exhaust manifold 30. In either case, temperature sensor 74 is operable to provide a temperature signal on signal path 76 indicative of the temperature of exhaust gas produced by engine 12.

Control computer 42 also includes a number of outputs for controlling one or more engine functions associated with system 10. For example, EGR valve 36 includes an EGR valve actuator 78 electrically connected to an EGR valve control output, EGRC, of control computer 42 via signal path 80. Control computer 42 is operable to produce an EGR valve control signal on signal path 80, and actuator 78 is responsive to the EGR valve control signal to control the position of EGR valve 36 relative to a reference position in a known manner. Control computer 42 is accordingly operable to control EGR valve 36 in a known manner to selectively provide a flow of recirculated exhaust gas from exhaust manifold 30 to intake manifold 14. EGR valve 36 further includes an EGR position sensor 66 electrically connected to an EGR valve position input, EGRP, of control computer 42 via signal path 68. Sensor 66 may be of known construction and is operable to determine a position of EGR valve 36 by determining a position of EGR valve actuator 78 relative to a reference actuator position, and producing a position signal on signal path 68 indicative of the position of EGR valve 36 relative to a reference position.

System 10 further includes a variable geometry turbocharger (VGT) mechanism, shown generally as 82, and electrically connected to a VGT control output, VGTC, of control computer 42 via signal path 84. The VGT mechanism may be embodied as any combination of a mechanical or electromechanical mechanism controllable in a known manner to modify the effective geometry of the turbocharger turbine 26, a wastegate disposed between conduits 32 and 34 and controllable in a known manner to selectively route exhaust gas around the turbine 26 and an exhaust throttle disposed in-line with either of conduits 32 and 34 and controllable in a known manner to selectively restrict exhaust gas flow through conduits 32 and 34 and turbine 26. Control computer 42 is accordingly operable to control any one or more of these VGT mechanisms in a known manner to selectively control the swallowing capacity and/or efficiency of the turbocharger 18.

System 10 further includes a fuel system 86 electrically connected to a fuel command output, FC, of control computer 42 via a number, K, of signal paths 88 wherein K may be any positive integer. Fuel system 86 is responsive to fueling commands, FC, produced by control computer 42 to supply fuel to engine 12 in a known manner.

Figure 2:
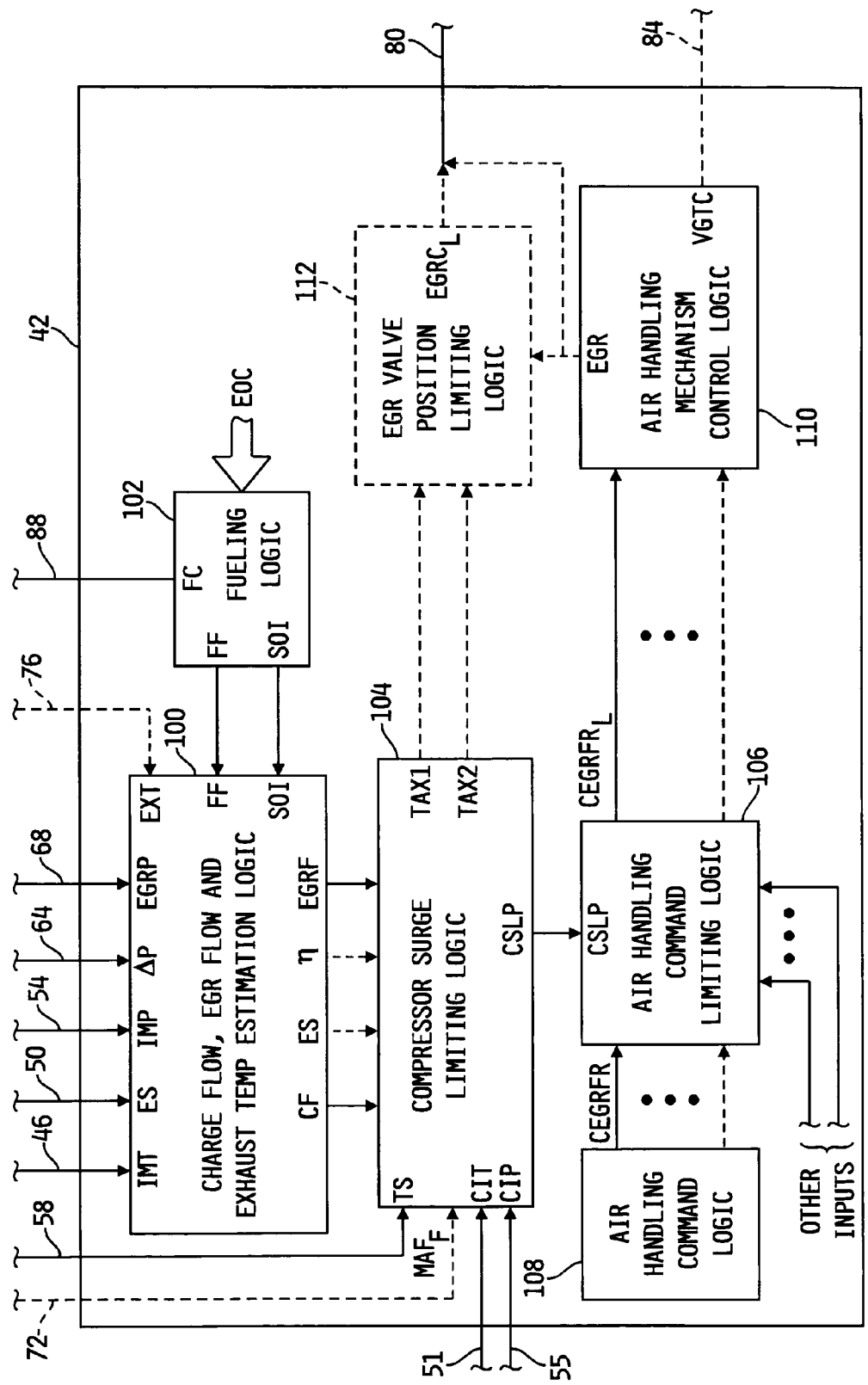
FIG. 2 is a block diagram of one illustrative configuration of some of the internal features of the control computer of FIG. 1 as they relate to controlling turbocharger compressor surge.

Referring now to FIG. 2, a block diagram of one illustrative configuration of some of the internal features of the control computer 42 of FIG. 1, as they relate to controlling turbocharger compressor surge, is shown. Control computer 42 includes a fueling determination block 102 receiving as inputs a number of engine operating condition values, EOC, including, for example, engine speed and other engine operating parameters, as is known in the art. Block 102 is responsive to the number of engine operating condition values, EOC, to determine a number of fueling parameters, including a mass fuel flow rate value, FF, and a start-of-fuel injection timing value, SOI, and to compute the fueling command, FC, as a function of these various fueling parameters, all in a manner well known in the art. The fueling determination block 102 is operable to provide the fueling command, FC, on signal path 88, and the fueling system 86 is responsive to the fueling command, FC, to supply fuel to engine 12 as described hereinabove.

Control computer 42 further includes a charge flow, EGR flow and exhaust temperature estimation block 100 having an intake manifold temperature input, IMT, receiving the intake manifold temperature signal on signal path 46, an engine speed input, ES, receiving the engine speed signal on signal path 50, an intake manifold pressure input, IMP, receiving the intake manifold pressure signal on signal path 54, a delta pressure input, ΔP, receiving the delta pressure signal on signal path 64, and an EGR valve position input, EGRP, receiving the EGR valve position signal on signal path 68. Optionally, as shown in phantom, block 100 may include an exhaust gas temperature input, EXT, receiving an exhaust gas temperature signal from optional sensor 74. In this embodiment, block 100 accordingly receives exhaust gas temperature information directly from sensor 74 and the exhaust temperature estimation logic portion of block 100 may therefore be omitted. In any case, block 100 also receives as inputs the mass fuel flow rate value, FF, and the start of injection value, SOI, from the fueling logic block 102. The charge flow, EGR flow and exhaust temperature estimation block 100 is operable, as will be more fully described hereinafter, to estimate EGR flow rate and provide this estimate at an EGR flow rate output, EGRF, to estimate exhaust gas temperature, and to estimate the air charge flow rate, CF, and provide this estimate at a charge flow output, CF, of block 100.

Control computer 42 further includes a compressor surge limiting logic block 104 having inputs receiving the charge flow, CF, and EGR flow, EGRF, values from logic block 100. Block 104 further includes a turbocharger speed input, TS, receiving the turbocharger rotational speed signal on signal path 58, a compressor inlet temperature input, CIT, receiving the compressor inlet temperature signal on signal path 51, a compressor inlet pressure input, CIP, receiving the compressor inlet pressure signal on signal path 55, and may optionally include another input receiving the fresh mass air flow value, $MAF_F$, produced on signal path 72 in embodiments of system 10 that include mass airflow sensor 70. In one embodiment, the compressor surge limiting logic block 104 is configured, as will be described in greater detail hereinafter, to produce a compressor surge limiting parameter, CSLP, as a function of at least some of its input variables. Additionally or alternatively, the compressor surge limiting logic block 104 may be configured, as will be described more fully hereinafter, to produce a pair of table axis values, TAX1 and TAX2, also as a function of at least some of its input variables.

Control computer 42 further includes an air handling command logic block 108 producing a commanded EGR fraction value, CEGRFR, corresponding to a desired EGR fraction, wherein the EGR fraction is the fractional amount of recirculated exhaust gas in the charge air supplied to the intake manifold 14. The charge air supplied to the intake manifold 14 is generally understood to be a combination of fresh air supplied to the intake manifold 14 via compressor 16 and recirculated exhaust gas provided to the intake manifold 14 via EGR valve 36. Logic block 108 may additionally be configured to produce other command values, as illustrated in phantom in FIG. 2. In one embodiment, logic block 108 is configured to produce the commanded EGR fraction value, CEGRFR, as a function of ambient air temperature, engine speed and coolant temperature, and details relating to specific embodiment of such a system are provided in U.S. Pat. No. 6,705,301, entitled SYSTEM FOR PRODUCING CHARGE FLOW AND EGR FRACTION COMMANDS BASED ON ENGINE OPERATING CONDITIONS, which is assigned to the assignee of the present invention, and the disclosure of which is incorporated herein by reference. Alternatively, the air handling command logic block 108 may be configured to produce at least the commanded EGR fraction value, CEGRFR, in any known manner as a function of one or more engine and/or air handling system operating conditions.

In embodiments of logic block 104 configured to produce the compressor surge limiting parameter, CSLP, control computer 42 further includes an air handling command limiting logic block 106 having a compressor surge limiting parameter input, TSLP, receiving the compressor surge limiting parameter, CSLP, from logic block 104, and another input receiving the commanded EGR fraction value, CEGRFR, produced by the air handling command logic block 108. Block 106 may include other inputs for receiving other engine and/or air handling system parameters and/or other information generated internally to control computer 42. The air handling command limiting logic block 106 is configured, as will be described in greater detail hereinafter, to limit the commanded EGR fraction command, CEGRFR, as a function of the compressor surge limiting parameter, CSLP, and to produce a correspondingly limited commanded EGR fraction value, $CEGRFR_L$. Logic block 106 may further be configured to produce other limit command values, as illustrated in phantom in FIG. 2.

Control computer 42 further includes an air handling mechanism control logic block 110 having an input receiving the limited EGR fraction command value, $CEGRFR_L$, and having an EGR valve control output, EGRC, producing the EGR valve control signals on signal path 80 and a VGT control output, VGTC, producing the VGT control signals on signal path 84. Logic block 110 may have additional inputs for receiving additional command values from logic block 106 as shown in phantom in FIG. 2. In embodiments of control computer 42 including the air handling command limiting block 106, the air handling mechanism control logic block 110 is operable to produce the EGR valve and/or VGT control signals, EGRC and VGTC, as functions of at least the limited EGR fraction command, $CEGRFR_L$, wherein such EGR valve and/or VGT control signals, EGRC and VGTC, control the position of the EGR valve 36 and/or any one or combination of the VGT control mechanisms described hereinabove in a manner that effectuates the flow of exhaust gas through the EGR valve 36 according to the limited EGR fraction command, $CEGRFR_L$. As it relates to the limited EGR fraction command, CEGRFR, produced by block 106, the air handling mechanism control logic block 110 is operable to control the position of the EGR valve 36 via a corresponding EGR value control signal, EGRC, that is based on CEGRFR to control the position of the EGR valve 36 so that the flow rate of exhaust gas therethrough is maintained at a flow rate below which turbocharger compressor surge is avoided. Details relating to one specific implementation of such an air handling mechanism control logic block 110 are set forth in U.S. Pat. No. 6,408,834, entitled SYSTEM FOR DECOUPLING EGR FLOW AND TURBOCHARGER SWALLOWING CAPACITY/EFFICIENCY CONTROL MECHANISMS, which is assigned to the assignee of the present invention, and the disclosure of which is incorporated herein by reference. In embodiments of control computer 42 that do not require for purposes of the present invention the air handling command limiting logic block 106 as just described, the air handling mechanism control logic block 110 may be a conventional command processing block configured in a known manner to produce the EGR valve and/or VGT control signals, EGRC and VGTC, as functions of at least the EGR fraction command, CEGRFR.

In some embodiments, the control computer 42 may further include an EGR valve position limiting logic block 112 having inputs receiving the table axis values, TAX1 and TAX2, from the compressor surge limiting logic block 104, and further having an input receiving the EGR valve control signal, EGRC, produced by the air handling mechanism control logic block 110, as shown in phantom. The EGR valve position limiting logic block 112 may be included in embodiments wherein the compressor surge limiting logic block 104 is configured to produce the table axis values, TAX1 and TAX2, in addition to the compressor surge limiting parameter, CSLP. The EGR valve position limiting logic block 112 is operable, as will be described in greater detail hereinafter, to limit at least under certain conditions the EGR valve control signal, EGRC, produced by block 110 as a function of TAX1 and TAX2, and to produce on signal path 80 a correspondingly limited EGR valve control signal, $EGRC_L$, wherein $EGRC_L$ controls the position of the EGR valve 36 so that the flow rate of exhaust gas therethrough is maintained at a flow rate below which turbocharger compressor surge is avoided. It will be understood that changing the EGR fraction command will generally cause existing air handling software being executed by the control computer 42 to compensate for the change in the resulting EGR fraction by changing one or more of the air handling control mechanisms including, but not limited to, a VGT, wastegate, and an exhaust throttle. As a practical matter, the compressor surge limiting parameter, CSLP, may accordingly be provided to the air handling command limiting logic block 106 to control the one or more air handling control mechanisms when limiting the EGR valve control signal to thereby avoid turbocharger compressor surge under all air handing system operating conditions.

In the embodiment illustrated in FIG. 2, the charge flow, EGR flow and exhaust gas temperature estimation block 100 is operable to estimate as a function of current engine operating conditions the charge flow rate, EGR flow rate and exhaust gas temperature. In one embodiment, the charge flow, EGR flow and exhaust gas temperature estimation block 100 is operable to estimate the mass flow of air charge entering the intake manifold 14, or charge flow value, CF, wherein the term "charge" or "air charge" is defined as a combination of fresh air entering the intake conduit 20 and recirculated exhaust gas provided by the EGR handling system comprising EGR valve 36, EGR cooler 40 and EGR conduit 38. In the illustrated embodiment, block 100 is operable to estimate the charge flow value, CF, by first estimating the volumetric efficiency (ηv) of the charge intake system, and then computing CF as a function of ηv using a conventional speed/density equation. Any known technique for estimating ηv may be used, and in one preferred embodiment of block 100, ηv is computed according to a known Taylor mach number-based volumetric efficiency equation given as:

$$\eta v = A_1 * \{(Bore/D)^2 * (stroke*ES)^B / \sqrt{\gamma * R * IMT} * [(1+EP/IMP) + A_2]\} + A_3 \quad (1),$$

where, $A_1$, $A_2$, $A_3$ and B are all calibratible parameters fit to the volumetric efficiency equation based on mapped engine data, Bore is the intake valve bore length, D is the intake valve diameter, stroke is the piston stroke length, wherein Bore, D and stroke are dependent upon engine geometry, γ and R are known constants (e.g., γ*R=387.414 J/kg/°K), ES is engine speed, IMP is the intake manifold pressure, EP is the exhaust pressure, where EP=IMP+ΔP, and IMT=intake manifold temperature.

In some embodiments, as described hereinabove, block 100 is configured to produce the volumetric efficiency value, $\eta v$, as an output thereof. In any case, with the volumetric efficiency value $\eta v$ estimated according to the foregoing equation, block 100 is operable to compute the charge flow value, CF, according to the equation:

$$CF = \eta v * V_{DIS} * ES * IMP / (2 * R * IMT) \quad (2),$$

where, $\eta v$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm °R or R=287 J/Kg/°K), and IMT is the intake manifold temperature.

Those skilled in the art will recognize that the charge flow value, CF, may alternatively be computed or otherwise determined according to other known techniques. For example, system 10 may optionally include a mass flow sensor disposed in fluid communication with the intake manifold 14 or intake conduit 20 downstream of the junction of conduit 20 and EGR conduit 38, wherein control computer 42 may be configured in a known manner to determine charge flow values directly from information provided by such a mass flow sensor. As another example, control computer 42 may be configured to estimate the charge flow value, CF, according to one or more known charge flow estimation techniques. Any such alternate mechanisms and/or techniques for determining the charge flow value, CF, are intended to fall within the scope of the claims appended hereto.

The charge flow, EGR flow and exhaust temperature estimation block 100 may further be operable to compute an estimate of the engine exhaust temperature, EXT, based on current engine operating conditions. In one embodiment, block 100 is configured to estimate EXT according to the equation:

$$EXT = IMT + [(A*ES) + (B*IMP) + (C*SOI) + D)] [(LHV*FF)/CF] \quad (3),$$

where,

IMT is the intake manifold temperature,

ES is the engine speed,

IMP is the intake manifold pressure,

SOI is the start of injection value produced by fueling logic block 102,

FF is the fuel flow value produced by fueling logic block 102,

CF is the mass flow rate of charge entering the intake manifold 14, which may be determined using any one or more of the techniques described hereinabove, LHV is a lower heating value of the fuel which is a known constant depending upon the type of fuel used by engine 12, and A, B, C, and D are model constants.

In an alternate embodiment, block 100 may be operable to compute the engine exhaust temperature estimate, EXT, according to the equation:

$$EXT = IMT + A + (B*SOI) + C/(CF/FF) + (D*SOI)/ES + E/[(ES*CF)/FF] \quad (4),$$

where,

IMT is the intake manifold temperature,

ES is the engine speed,

SOI is the start of injection value produced by fueling logic block 102,

FF is the fuel flow value produced by fueling logic block 102,

CF is the charge mass flow rate, and

A, B, C, and D are model constants.

Further details relating to either of the engine exhaust temperature models represented by equations (3) and (4) are provided in U.S. Pat. No. 6,508,242, entitled SYSTEM FOR ESTIMATING ENGINE EXHAUST TEMPERATURE, which is assigned to the assignee of the present invention, and the disclosure of which is incorporated herein by reference. Those skilled in the art will recognize that the exhaust gas temperature value, EXT, may alternatively be computed or otherwise determined according to other known techniques. For example, system 10 may optionally include the exhaust gas temperature sensor 74 illustrated in phantom in FIG. 1, wherein control computer 42 may be configured in a known manner to determine exhaust gas temperature information directly from information provided by sensor 74. As another example, control computer 42 may be configured to estimate the exhaust gas temperature, EXT, according to one or more other known exhaust gas temperature estimation techniques. Any such alternate mechanisms and/or techniques for determining the exhaust gas temperature value, EXT, are intended to fall within the scope of the claims appended hereto.

The charge flow, EGR flow and exhaust temperature estimation logic block 100 is further operable to estimate EGR flow rate, EGRF, as a function of the pressure differential value, ΔP, the intake manifold pressure, IMP, the engine exhaust temperature, EXT, and an effective flow area, EFA, corresponding to the cross-sectional flow area defined through EGR conduit 38. In the embodiment illustrated in FIGS. 1 and 2, the EGR flow and exhaust temperature estimation block 100 is operable to compute the effective flow area value, EFA, as a function of the EGR valve position signal, EGRP. In such embodiments, block 100 may include one or more equations, graphs and/or tables relating EGR position values, EGRP, to effective flow area values, EFA. In any case, block 100 is operable to estimate the EGR flow value, EGRF according to the equation:

$$EGRF = EFA * \text{sqrt}[|(2*\Delta P*IMP)/(R*EXT)|] \quad (5),$$

where,

EFA is the effective flow area through EGR conduit 38,

ΔP is the pressure differential across EGR valve 36,

IMP is the intake manifold pressure,

R is a known gas constant (e.g., R=53.3 ft-lbf/lbm °R or R=287 J/Kg/°K), and

EXT is the exhaust gas temperature, which may be determined using any one or more of the techniques described hereinabove.

Further details relating the foregoing EGR flow rate estimation technique, as well as other suitable EGR flow rate estimation techniques, are described in U.S. Pat. No. 6,837,227, entitled SYSTEM AND METHOD FOR ESTIMATING EGR MASS FLOW AND EGR FRACTION, which is assigned to the assignee of the present invention, and the disclosure of which is incorporated herein by reference. Those skilled in the art will recognize that other known techniques may be used to estimate or otherwise determine the EGR flow rate value, EGRF. For example, system 10 may include a temperature sensor in fluid communication with the outlet of the EGR cooler 40 in embodiments of system 10 including such a cooler 40, wherein such a sensor is operable to produce a cooler outlet temperature signal indicative of the temperature of exhaust gas exiting the EGR cooler 40. In such embodiments, the cooler outlet temperature signal may replace the exhaust gas temperature value, EXT, in equation (5). As it relates to the present invention, logic block 100 is operable to estimate the exhaust gas temperature, EXT, primarily for inclusion in equation (5) to estimate the EGR flow rate, EGRF. In embodiments of system 10 including an EGR cooler outlet temperature sensor as just described, the exhaust gas temperature value, EXT, is therefore not necessary and the exhaust gas temperature estimation portion of logic block 100 may accordingly be omitted.

Alternatively, system 10 may include a CO or $CO_2$ sensor of known construction and fluidly coupled to intake manifold 14 or intake conduit 20 downstream of the junction of intake conduit 20 with the EGR conduit 38. Such a CO or $CO_2$ sensor will be operable to produce a signal indicative of the CO or $CO_2$ level of charge air entering the intake manifold 14, and such information may be used to determine the EGR flow rate value, EGRF, using known equations. As another example, the EGR conduit 38 may have a mass flow rate sensor in fluid communication therewith, wherein the EGR flow rate, EGRF, may be determined directly from information provided by such a sensor. As yet another example, the control computer 42 may include other EGR flow rate estimation algorithms, such as one or more of the alternative algorithms described in the above-referenced U.S. Pat. No. 6,837,227, wherein control computer 42 may be operable to estimate the EGR flow rate according to one or more such alternative EGR flow rate estimation strategies. Any and all such alternative EGR flow rate determination techniques and strategies are intended to fall within the scope of the claims appended hereto.

Figure 3:
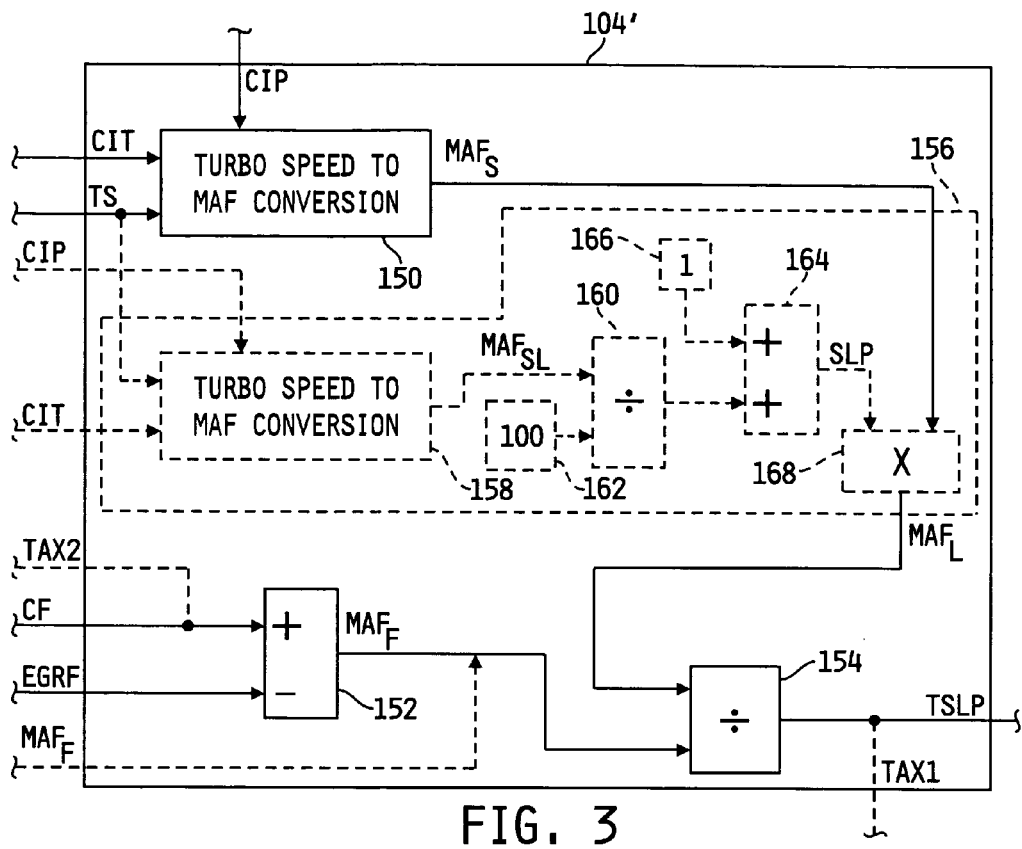
FIG. 3 is a block diagram of one illustrative configuration of the compressor surge limiting logic block of FIG. 2.
Figure 4:
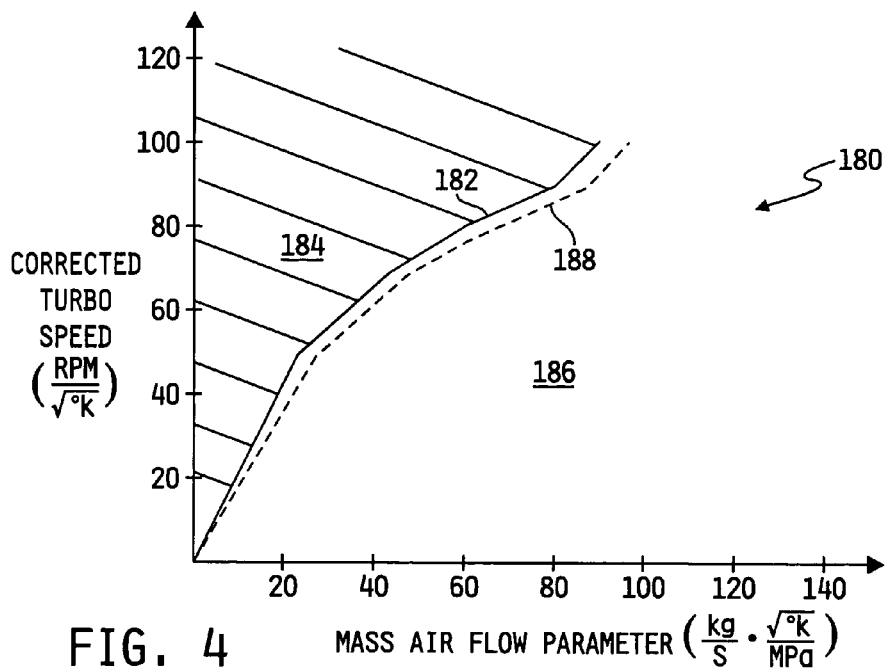
FIG. 4 is a plot of corrected turbocharger speed vs. intake mass air parameter illustrating turbocharger compressor surge and compressor surge danger regions.

Referring now to FIG. 3, one illustrative embodiment 104' of the compressor surge limiting logic block 104 of FIG. 2 is shown. In this embodiment, block 104' includes a turbocharger speed-to-fresh air mass flow rate conversion block 150 receiving the turbocharger speed signal, TS, compressor inlet temperature signal, CIT, and compressor inlet pressure signal, CIP, and producing a corresponding mass flow rate surge value, $MAF_S$. The mass flow rate surge value, $MAF_S$, represents a turbocharger speed-dependent mass flow rate of fresh air (entering the intake manifold 14 via compressor 16) below which turbocharger compressor surge occurs and above which turbocharger compressor surge is avoided. Conversion block 150 may be provided in the form on one or more equations, graphs, tables or the like relating turbocharger speed, TS, compressor inlet temperature, CIT, and compressor inlet pressure, CIP, to the mass flow rate surge value, $MAF_S$, and a graphical representation of one illustrative embodiment of conversion block 150 is illustrated in FIG. 4. Referring to FIG. 4, a plot 180 of corrected turbocharger speed vs. mass flow parameter is illustrated. The corrected turbocharger speed, CTS, is determined as a ratio of turbocharger speed, TS, and the square root of the compressor inlet temperature, CIT, or $CTS=TS/(CIT)^{1/2}$. The mass flow parameter, MFP, in the illustrated embodiment, is determined as a ratio of the product of the fresh air mass flow rate, $MAF_F$ and the square root of the compressor inlet temperature, CIT, and the compressor inlet pressure, or $MFP=MAF_F*(CIT)^{1/2}/CIP$. The turbocharger speed/mass flow rate curve 182 represents the boundary between normal compressor operation and compressor surge conditions. Region 184 represents corrected turbocharger speed and mass flow parameter conditions at which turbocharger compressor surge occurs and exists, and region 186 represents corrected turbocharger speed and mass flow parameter conditions at which turbocharger compressor surge will not occur and does not exist. Curve 182 thus represents a corrected turbocharger speed dependent mass flow parameter surge function, $MAF_S$, or "surge line", and turbocharger compressor surge is avoided for fresh air mass flow rate values greater than $MAF_S$.

Returning again to FIG. 3, block 104' further includes an arithmetic block 152 receiving the charge flow value, CF, at an additive input and the EGR flow value, EGRF, at a subtractive input, wherein CF and EGRF are each produced by logic block 100. Arithmetic block 152 is operable to compute as the difference between CF and EGRF, an estimated value, $MAF_F$, of the mass flow rate of fresh air supplied to intake manifold 14 via compressor 16, or $MAF_F=CF-EGRF$. In embodiments of system 10 including fresh air mass flow rate sensor 70, the fresh air mass flow rate value, $MAF_F$, may be obtained directly from information provided by sensor 70 as shown in phantom in FIG. 3. As it relates to the embodiment of the turbocharger surge limiting logic block 104' illustrated in FIG. 3, the arithmetic block 152 may be omitted from block 104', and the charge flow, EGR flow and exhaust temperature estimation logic block 100 may be omitted, in such embodiments wherein the fresh air mass flow rate value, $MAF_F$, is obtained directly from sensor 70.

In one embodiment of block 104', the mass flow rate surge value, $MAF_S$, is provided directly to one input of a divider block 154 (block-168 is omitted in this embodiment), and the fresh air mass flow rate value, $MAF_F$, is provided to another input of divider block 154, wherein block 154 is operable to produce as the turbocharger surge limiting parameter, TSLP, a flow ratio corresponding to the ratio of the mass flow rate surge value, $MAF_S$, and the mass flow rate of fresh air, $MAF_F$, or $TSLP=MAF_S/MAF_F$. In an alternative embodiment, the turbocharger speed limiting logic block 104' may optionally include a mass flow rate surge limit logic block 156 having another turbocharger speed-to-fresh air mass flow rated conversion block 158 receiving as an input the turbocharger speed value, TS, the compressor inlet temperature, CIT and the compressor inlet pressure value, CIP, and producing as an output a mass flow rate surge limit, $MAF_{SL}$. The mass flow rate surge limit, $MAF_{SL}$, represents a turbocharger speed-dependent mass flow rate of fresh air (entering the intake manifold 14 via compressor 16) that is greater than the mass flow rate surge value, $MAF_S$. Conversion block 158 may be provided in the form of one or more equations, graphs, tables or the like relating turbocharger speed, TS, compressor inlet temperature, CIT, and compressor inlet pressure, CIP, to the mass flow rate surge value, $MAF_S$, and a graphical representation of one illustrative embodiment of conversion block 158 is illustrated in FIG. 4. Referring again to FIG. 4, dashed-line curve 188 represents a corrected turbocharger speed dependent mass flow parameter surge limit function, $MAF_{SL}$, wherein turbocharger compressor surge is not only avoided for fresh air mass flow rate values greater than $MAF_{SL}$, but also for a definable error band or window of fresh air mass flow rate values less than $MAF_{SL}$. It is to be understood that the $MAF_{SL}$ curve 188 may be variously positioned relative to the $MAF_S$ curve 182 to provide for any desired error band or window of fresh air mass flow rate values therebetween. Generally, the mass flow parameter surge limit function, $MAF_{SL}$, may be included within block 104' to provide a safe fresh air mass flow rate limit target for not only avoiding turbocharger compressor surge, but also for allowing some amount of overshoot of the mass flow rate surge limit, $MAF_{SL}$, to fresh air mass flow rate values less than $MAF_{SL}$ during EGR valve control without risking operation in the turbocharger compressor surge region 184. Alternatively, the mass flow rate surge limit, $MAF_{SL}$, may in some embodiments be positioned to the left of the mass flow rate surge curve, $MAF_S$, to allow under specified conditions for fresh air mass flow rate values less than $MAF_{SL}$.

Returning again to FIG. 3, block 156 further includes a divider block 160 receiving as inputs the mass flow rate surge limit, $MAF_{SL}$, and a constant value, e.g., 100, produced by block 162. In the illustrated embodiment, the output of the divider block 160 is the ratio $MAF_{SL}/100$, which is supplied to one input of a summation block 164 having another input receiving another constant value, e.g., 1, produced by block 166. In the illustrated embodiment, the summation block 164 produces as an output a surge limit percentage, SLP, according to the equation $[1+(MAF_{SL}/100)]$. Block 156 further includes a multiplication block 168 having one input receiving the surge limit percentage, SLP, produced by summation block 164 and another input receiving the mass flow rate surge value, $MAF_S$, wherein the output of multiplication block 168 is a mass flow limit, $MAF_L$, according to the equation $MAF_S*[1+(MAF_{SL}/100)]$. The mass flow limit, $MAF_L$, is provided, in this embodiment, as one input of the divider block 154 so that the compressor surge limiting parameter, CSLP, in this embodiment, is given by the equation $CSLP=\{MAF_S*[1+(MAF_{SL}/100)]\}/MAF_F$. It is to be understood that while this alternate embodiment of the turbocharger surge limiting logic block 104' has been illustrated and described as producing the turbocharger surge limiting parameter, CSLP, as a product of the flow ratio $MAF_S/MAF_F$ and the surge limit percentage $[1+(MAF_{SL}/100)]$, the mass flow rate surge limit, $MAF_{SL}$, may alternatively be applied to the mass flow rate surge value, $MAF_S$, as an offset, in which case the compressor surge limiting parameter, CSLP, may take the general form $CSLP=[MAF_S+/-(K* MAF_{SL})]/MAF_F$, wherein "K" may be an integer or non-integer constant. In either case, that is with $CSLP=MAF_S/MAF_F$ or $CSLP=[MAF_S+/-(K*MAF_{SL})]/MAF_F$, turbocharger compressor surge is avoided by controlling the flow rate of recirculated exhaust gas through the EGR valve 36, such as by controlling the EGR fraction command, CEGRFR, in a manner that maintains CSLP at a value less than unity.

Figure 5:
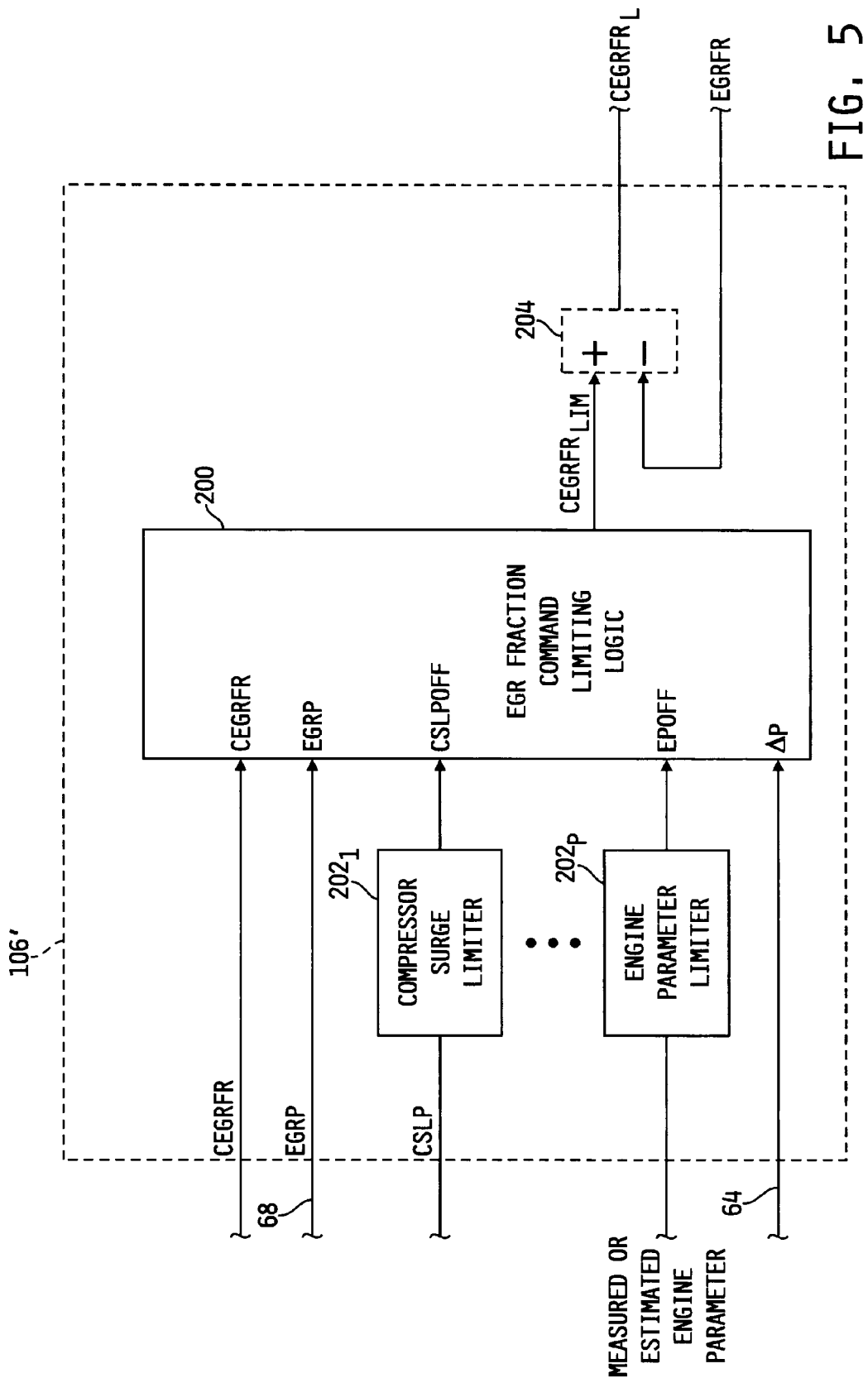
FIG. 5 is a block diagram of one illustrative configuration of the air handling command limiting logic block of FIG. 2 for use with the compressor surge limiting logic block of FIG. 3.

In embodiments of the compressor surge limiting logic block 104' producing the compressor surge limiting parameter, CSLP, as just described, control computer 42 includes the air handling command limiting logic block 106 described hereinabove with respect to FIG. 2. Referring now to FIG. 5, one illustrative embodiment 106' of the air handling command limiting logic block 106 illustrated in FIG. 2, as it relates to the compressor surge limiting logic block 104' of FIG. 3, is shown. Block 106' includes an EGR fraction command limiting logic block 200 having a first input CEGRFR receiving the commanded EGR fraction value CEGRFR produced by the air handling command logic block 108, a second input EGRP receiving the EGR position signal EGRP via signal path 68 and a third input receiving the differential pressure signal $\Delta P$ via signal path 64. Block 106' may further include a number, P, of operational value limiter blocks $202_1$–$202_P$ providing the EGR fraction command limiting logic block 200 with limiting offset values based on corresponding engine and/or turbocharger operational parameters, wherein P may be any positive integer. One such limiter block, $202_1$, is a compressor surge limiter block receiving as an input the compressor surge limiting parameter, CSLP, produced by the compressor surge limiting logic block 104', and providing a corresponding offset value to a compressor surge limiting parameter offset input CSLPOFF of the EGR fraction command limiting logic block 200. Another limiter block, $202_P$, may be an engine parameter limiter block receiving as an input a measured or estimated engine parameter and providing a corresponding offset value to an engine parameter offset input EPOFF of the EGR fraction command limiting logic block 200. Examples of any of the operational value limiter blocks $202_2$–$202_P$ may include, but are not limited to, a compressor outlet temperature limiter block receiving as an input a temperature signal indicative of the temperature at an outlet of the turbocharger compressor 16, a turbocharger speed limiter block receiving as an input the turbocharger speed signal TS on signal path 58, a $\Delta P$ limiter block receiving as an input the differential pressure signal $\Delta P$ on signal path 64, and the like. In any case, block 200 is operable to process the offset signals provided by the one or more operational value limiter blocks $202_1$–$202_P$ in a manner to be described in greater detail hereinafter, and to produce a limited EGR fraction command $CEGRFR_{LIM}$, corresponding to the commanded EGR flow value CEGRF that is limited as a function of at least the compressor surge limiting parameter offset value, CSLPOFF, and that may further be limited as a function of any one or more additional offset values produced by any of the remaining operational value limiter blocks $202_2$–$202_P$.

In one embodiment, the limited EGR fraction command, $CEGRFR_{LIM}$, is supplied to an additive input of an arithmetic block 204 having a subtractive input receiving a measured or estimate value of the EGR fraction, EGRFR. One technique for estimating the EGR fraction value, EGRFR, as a function of the estimated EGR flow rate value, EGRF, produced by the charge flow, EGR flow and exhaust temperature estimation block 100 of FIG. 2, will be described in detail hereinafter with respect to FIG. 10, although it will be understood that for purposes of the air handling command limiting logic block 106' of FIG. 5, the EGR fraction value, EGRFR, provided to the subtractive input of arithmetic block 204 may be estimated, measured or otherwise determined via any known technique. In any case, the resulting difference between the limited EGR fraction command, CEGRFR$_{LIM}$, and the measured or estimated EGR fraction value, EGRFR, is a commanded EGR fraction limit value, CEGRFR$_L$ that is supplied to the air handling mechanism control logic block 110 of FIG. 2. The air handling mechanism control logic block 110 is operable to control the position of the EGR valve 36 via a corresponding EGR value control signal, EGRC, that is based on CEGR-FR$_L$ to control the position of the EGR valve 36 as well as the position of the one or more VGT actuators so that the flow rate of exhaust gas therethrough is maintained at a flow rate below which turbocharger compressor surge is avoided.

Figure 6:
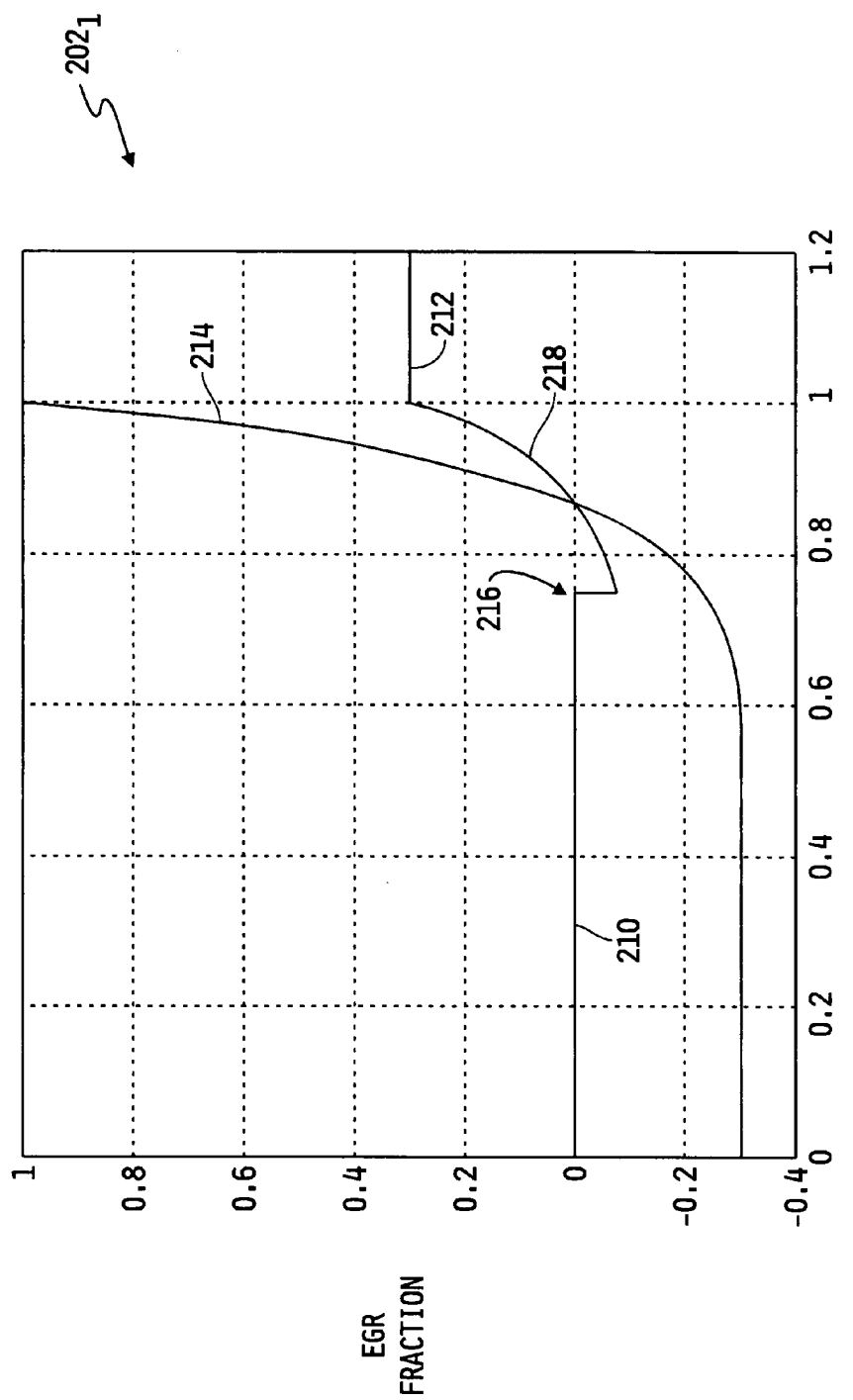
FIG. 6 is a plot of EGR fraction vs. compressor surge limiting parameter illustrating one embodiment of the compressor surge limiter block of FIG. 5.

Referring now to FIG. 6, an example plot is shown illustrating operation of at least the compressor surge limiter block 202, of FIG. 5. In the illustrated embodiment, limiter block 202, imposes a penalty function based on the difference between the current CSLP value and a predefined maximum parameter value, and then computes a derate in units of EGR fraction based on this difference. The offset output value for limiter 202$_1$ is the derated parameter value in units of EGR fraction. The net effect of the derate is to decrease or restrict the opening of the EGR valve 36 to thereby decrease the EGR flow rate therethrough and correspondingly decrease the EGR fraction of the charge air supplied to the intake manifold 14, as well as correspondingly controlling the one or more VGT mechanisms.

The penalty function imposed block 202$_1$, in one embodiment, computes a penalty based on a predefined maximum limit and the current value of CSLP, according to the equation:

Penalty=Max Limit/(Max CSLP Limit−Current CSLP Value), wherein the Penalty term increases exponentially as the Current CSLP Value approaches the Max CSLP Limit.

To prevent the Penalty function from computing a derate under all operating conditions, the function is positioned with respect to a desired starting Current CSLP Value for application of the derate by adding a Limit Ratio, such that the Penalty function becomes a Penalty Factor defined by the equation:

Penalty Factor=[Max Limit/(Max CSLP Limit−Current CSLP Value)]−1/(1−Limit Ratio).

This is illustrated in the EGR fraction vs. TSLP plot 202$_1$ of FIG. 6, wherein the Penalty Factor is represented by line 214 and the Penalty Factor crosses zero (line 210) at the Limit ratio 216 (75 in FIG. 6). The derate is illustrated by curve 218 and is limited to a maximum derate 212.

The Penalty Factor must also be scaled into the units of the parameter being derated, e.g., EGR fraction, by multiplying the Penalty Factor by a gain term. This results in the actual derate value which is represented in the plot 202, of FIG. 6 by line 212. Thus, to tune limiter block 202$_1$ for operation, three parameters must be specified: (1) Max CSLP Limit, (2) Limit Ratio—e.g., specified as a fraction of the Max CSLP Limit that corresponds to the desired start of derate, and (3) Gain—to convert the Penalty Factor into units of EGR fraction. In the example illustrated in FIG. 6, the gain is 0.3 and the maximum derate is 0.3.

It is to be understood that the penalty function just described is provided only by way of example, and that other penalty functions may be provided for the turbocharger surge limiter block 202$_1$. Those skilled in the art will recognize that the penalty functions imposed by any of blocks 202$_1$–202$_P$ may take on many forms, and that any penalty functions satisfying the general control concepts described herein are intended to fall within the scope of the claims appended hereto.

Figure 7:
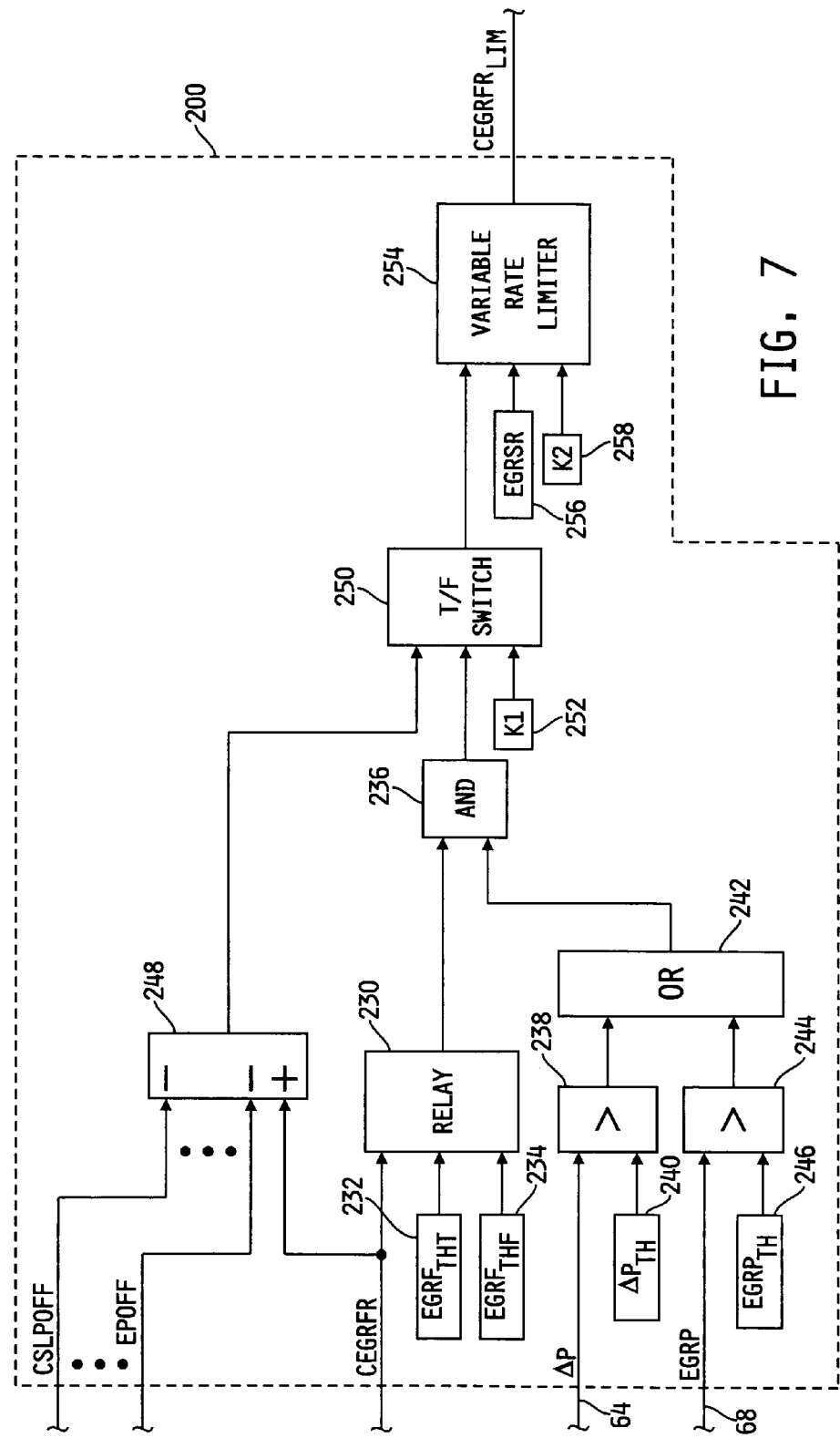
FIG. 7 is a block diagram of one illustrative embodiment of the EGR fraction command limiting logic block of FIG. 5.

Referring now to FIG. 7, one illustrative embodiment of the EGR fraction command limiting logic block 200 of FIG. 5 is shown. Block 200 includes a constant block 246 producing an EGR position threshold value EGRP$_{TH}$ that corresponds to the smallest displacement of the EGR valve 32 that can be detected. This value is fed, along with the EGR position signal EGRP on signal path 68, to a function block 244 that produces a TRUE value if EGRP is greater than EGRP$_{TH}$, and that produces a FALSE value if EGRP is less than or equal to EGRP$_{TH}$. Another constant block 240 produces a ΔP threshold value ΔP$_{TH}$ that is a function of the range of the ΔP sensor 60 and of the mechanical capabilities of the EGR valve 36. This value is fed, along with the ΔP signal on signal path 64, to a function block 238 that produces a TRUE value if ΔP is greater than ΔP$_{TH}$, and that produces a FALSE value if ΔP is less than or equal to ΔP$_{TH}$. The outputs of function blocks 238 and 244 are supplied to an OR block 242 having an output leading to one input of an AND block 236. In the operation of blocks 238–246, the output of the OR block 242 is TRUE only if/when the EGR valve 36 is open or if/when ΔP is below the ΔP limit for EGR valve opening. The operation of the functional blocks just described therefore prevent the EGR valve 36 from opening under high ΔP conditions.

Block 200 further includes a relay block 230 receiving the commanded EGR fraction signal, CEGRFR, at a first input thereof. A second input of relay block 230 receives an EGR fraction true threshold value EGRF$_{THT}$ from block 232, and a third of relay block 230 receives an EGR fraction false threshold value EGRF$_{THF}$ from block 234. The output of relay block 230 feeds a second input of AND block 236. Relay block 230 is operable to produce a TRUE signal if the commanded EGR fraction value, CEGRFR, is above the true threshold EGRF$_{THT}$ and produces a FALSE value if the commanded EGR fraction value, CEGRFR, is below the false threshold EGRF$_{THF}$, wherein EGRF$_{THF}$ is less than EGRF$_{THT}$.

The output of the AND block 236 is provided to one input of a true/false switch 250 having a second input receiving the output of a commanded EGR fraction reduction block 248. Block 248 has a first additive input receiving the commanded EGR value, CEGRFR, a second subtractive input receiving the compressor surge limit parameter offset value, CSLPOFF, produced by the compressor surge limiter block 202$_1$, and any number of remaining subtractive inputs each receiving an offset value from a corresponding one of any of the remaining operating parameter limiters 202$_2$–202$_P$. The commanded EGR fraction reduction block 248 is operable to reduce the commanded EGR fraction value, CEGRFR, by subtracting from CEGRFR the compressor surge limiting parameter offset value, CSLPOFF, as well as any other operating parameter offset value produced by any of the remaining operating parameter limiters 202$_2$–202$_P$. In any case, true/false switch 250 has a third input receiving a constant value K1 (e.g., zero) from block 252, and an output feeding one input of a variable rate limiter block 254 of known construction. If the output of AND block 236 is true, the true/false switch 250 provides the reduced EGR fraction command value produced by block 248 to the input of the variable rate limiter 254, and otherwise the true/false switch 250 provides the value K1 (e.g., zero) to the input of the variable rate limiter. The variable rate limiter block 254 includes a second input receiving an EGR slew rate value EGRSR from block 256 and a third input receiving a constant value K2 from block 258. The EGR slew rate value may be calibratible for a desired exhaust particulate level, and its value may be set through appropriate tuning in an emissions cell. The constant K2 may be set to a low enough value such that while the resulting limited EGR fraction command $CEGRFR_{LIM}$ rises in value according to the slew rate value, EGRSR, under EGR valve opening conditions, the reduced EGR fraction command produced by block 248 is effectively not limited under EGR valve closing conditions, and $CEGRFR_{LIM}$ may therefore drop sharply in value.

It is to be understood that the EGR fraction command limiting logic block 200 illustrated in FIG. 7 is shown for the case where the penalty functions imposed by limiter blocks $202_1$–$202_P$ are each provided in units of EGR fraction only. Block 100 is thus designed such that CSLPOFF, and the offset values produced by any of the remaining operating parameter limiters $202_2$–$202_P$, affect only the limited EGR fraction command, $CEGRFR_{LIM}$. Those skilled in the art will recognize that block 200 could alternatively or additionally be configured such that CSLPOFF, and any one or more of the remaining offset values, impacts one or more other air handling system commands via the VGT control signal. Further details relating to one specific implementation of the air handling command logic block 106' just described may be found in U.S. Pat. No. 6,480,782, entitled, SYSTEM FOR MANAGING CHARGE FLOW AND EGR FRACTION IN AN INTERNAL COMBUSTION ENGINE, which is assigned to the assignee of the present invention, and the disclosure of which is incorporated herein by reference.

As described hereinabove with respect to FIG. 3, turbocharger compressor surge is avoided as long as CSLP is maintained at a value less than unity. The air handling command limiting logic block 106' just described is operable to limit the commanded EGR fraction value, CEGRF, so that the air handling mechanism control logic block 110 is operable to control the position of the EGR valve 36 via a corresponding EGR value control signal, EGRC, that is based on the resulting limited EGR fraction command, CEGRFL, to control or derate the position of the EGR valve 36 for CSLP values greater than unity so that the flow rate of exhaust gas therethrough is maintained at a flow rate below which turbocharger compressor surge is avoided. Alternatively or additionally, the VGT control signal may be controlled in a similar manner to reduce the EGR fraction.

As described hereinabove with respect to FIG. 2, embodiments of the compressor surge limiting logic block 104 are contemplated that may not produce the compressor surge limiting parameter, CSLP, and instead, or in addition to producing CSLP, produce the table axis parameters TAX1 and TAX2. Returning to FIG. 3, the embodiment of the compressor surge limiting logic block 104' illustrated and described may alternatively or additionally provide CSLP as the first table axis parameter, TAX1, and the charge flow value, CF, as the second table axis parameter, TAX2, as shown in phantom. In this embodiment, control computer 42 includes the EGR valve position limiting logic block 112, which may alternatively or additionally limit the EGR valve control signal, EGRC, produced by block 110, and/or to manipulate the VGT, to control turbocharger compressor surge.

Figure 8:
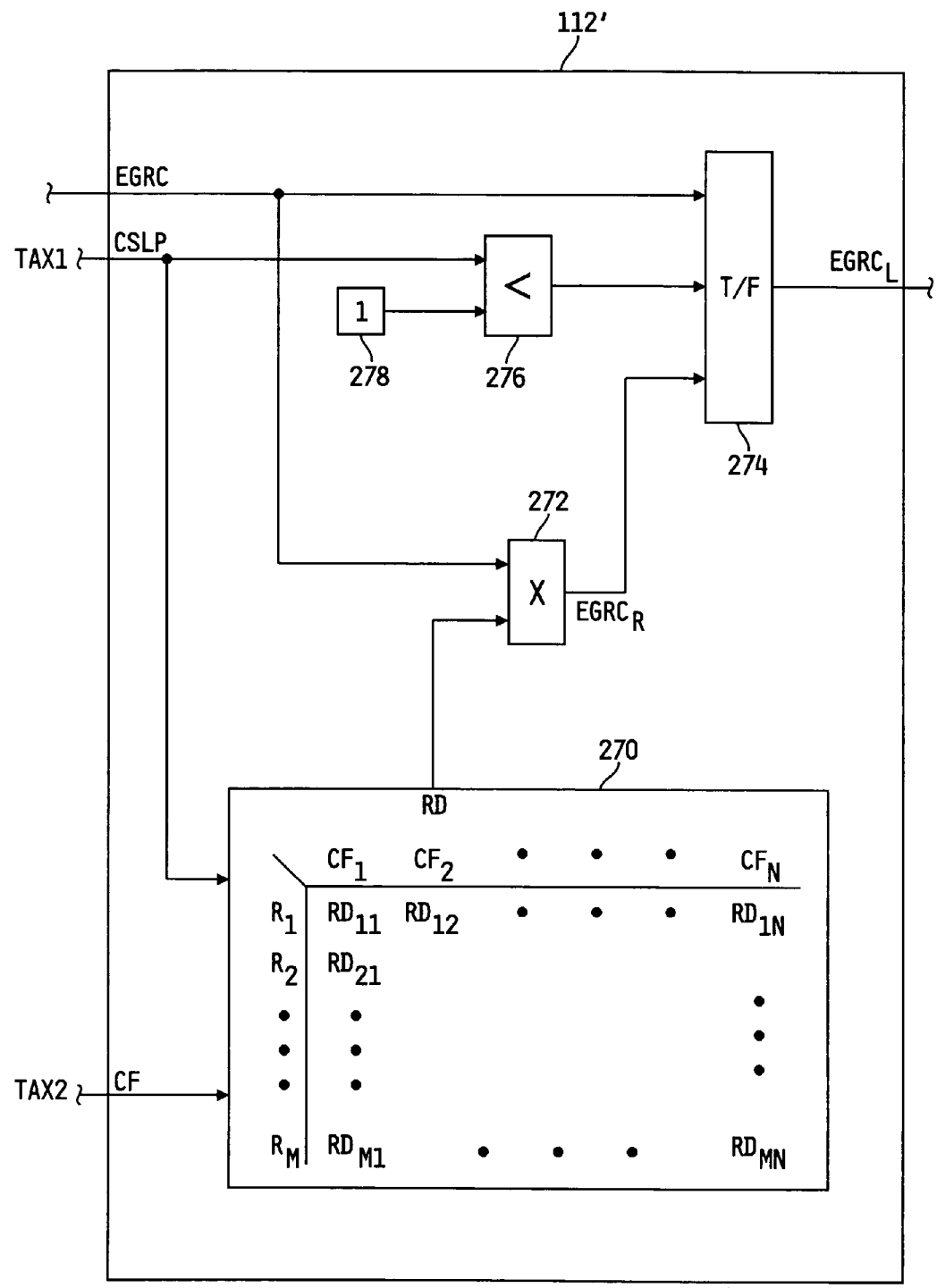
FIG. 8 is a block diagram on one illustrative embodiment of the EGR valve position limiting logic block of FIG. 2 as it relates to the compressor surge limiting logic block embodiment illustrated in FIG. 3.

Referring now to FIG. 8, one illustrative embodiment 112' of the EGR valve position limiting logic block 112 is shown as it relates to the table axis values, TAX1 and TAX2, produced by the turbocharger surge limiting logic block 104' of FIG. 3. The embodiment 112' illustrated in FIG. 8 will be described as being configured to limit the EGR valve control signal, EGRC, to control turbocharger compressor surge in the absence of the air handling command limiting logic block 106', although it is to be understood that embodiment 112' may alternatively be used in combination with block 106' to augment or enhance the operation of block 106'. In any case, the EGR valve position limiting logic block 112' of FIG. 8 includes an EGR valve control signal reduction table 270 receiving as one table axis, e.g., TAX1, the compressor surge limiting parameter, CSLP, and as the other table axis, e.g., TAX2, the charge flow value, CF. In this embodiment, the compressor surge limiting parameter, CSLP, corresponds to a flow ratio in the form of $MAF_S/MAF_F$ or $\{MAF_S*[1+(MAF_{SL}/100)]\}/MAF_F$, as described hereinabove, wherein either flow ratio is represented in table 270 by the variable "R." Flow ratio values $R_1$–$R_M$ define one axis of table 270, and charge flow values $CF_1$–$CF_N$ define the other axis of table 270, and the table 270 is populated with EGR valve control signal reduction values, $RD_{11}$–$RD_{MN}$, wherein "M" and "N" may be any positive integers. Generally, the reduction values $RD_{11}$–$RD_{MN}$ are less than unity, so that subsequent multiplication of the EGR valve control signal, EGRC, by an appropriate one of the RD values by multiplication block 272 to produce the reduced EGR valve control signal, $EGRC_R$, results in a reduction of, or decrease in, the flow of recirculated exhaust gas through the EGR valve 36.

Block 112' further includes a function block 276 receiving at one input the compressor surge limiting parameter, CSLP, and receiving at another input a constant value, e.g., 1, via block 278. If TSLP is less than 1, the output of the function block 276 is TRUE, and if TSLP is greater than or equal to 1 the output of the function block 276 is FALSE. The output of function block 276 is provided to a control input of a true/false switch or block 274 having a second input receiving the EGR valve control signal, EGRC, and a third input receiving the reduced EGR valve control signal, $EGRC_R$, produced by the multiplication block 272. The output of the true/false block 274 is the limited EGR valve control signal, $EGRC_L$.

Block 112' is configured such that the true/false block 274 passes the EGR valve control signal, EGRC, directly to the $EGRC_L$ output as long as CSLP remains less than unity. However, if CSLP is greater than or equal to unity, true/false block 274 passes the reduced EGR valve control signal, $EGRC_R$ to the $EGRC_L$ output, wherein $EGRC_R$ is the EGR valve control signal, EGRC, reduced by an appropriate one of the reduction values, RD, of table 270 as a function of CSLP and the charge flow value, CF. The reduction values, RD, populating table 270 are selected so that the resulting reduced EGR valve control signal value, $EGRC_R$, for CSLP values greater than unity, control the EGR valve 36 in a manner that maintains the flow rate of recirculated exhaust gas therethrough below a flow rate at which turbocharger compressor surge occurs.

It will be understood that while the EGR valve position limiting logic block 112' of FIG. 8 is illustrated and described as an open-loop EGR valve control signal limiting strategy, block 112' may alternatively be configured as a closed-loop EGR valve control signal limiting strategy using known techniques well within the knowledge of a skilled artisan. For example, block 112' may be modified to form a closed-loop control strategy by feeding back the EGR position signal, EGRP, computing an error between the limited EGR valve control signal, $EGRC_L$ and the EGR position signal, EGRP, and controlling this error value to zero via a suitable controller of known construction, e.g., using any combination of known proportional, integral and derivative techniques or the like. Any such modifications to block 112' to effectuate closed-loop control of the limited EGR valve control signal, $EGR_L$, would be a mechanical step for a skilled artisan.

Figure 9:
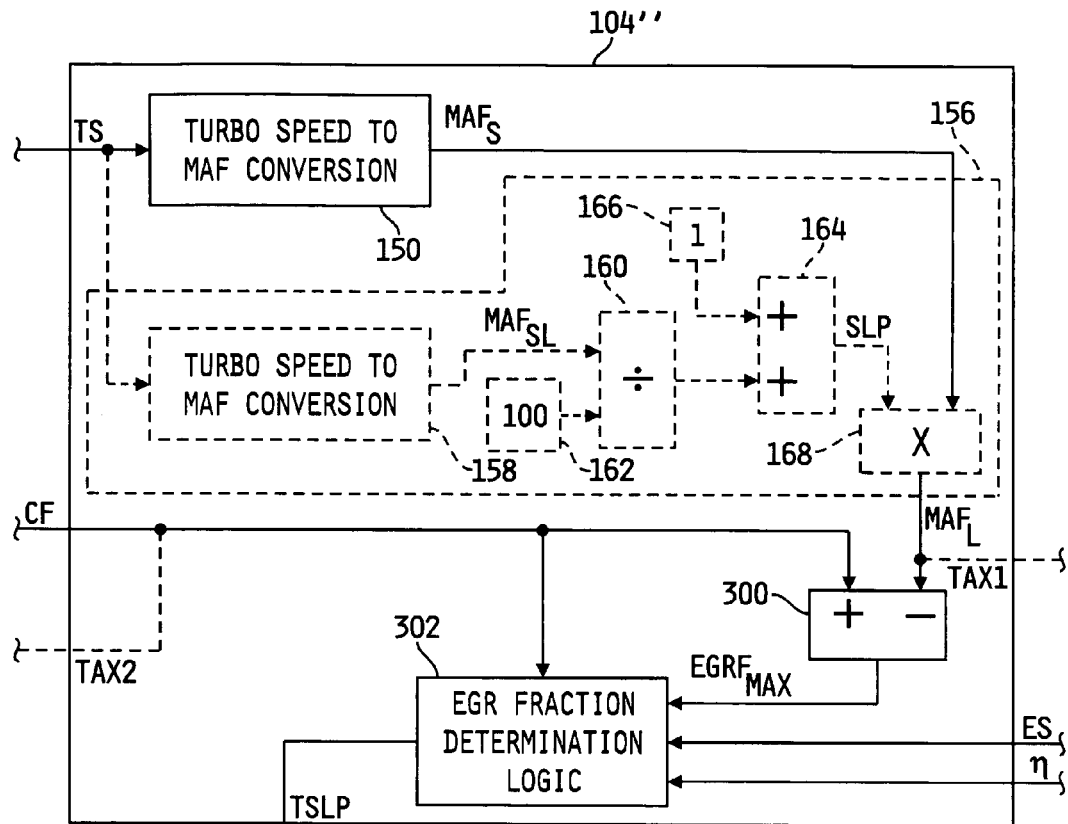
FIG. 9 is a block diagram of another illustrative configuration of the compressor surge limiting logic block of FIG. 2.

Referring now to FIG. 9, another illustrative embodiment 104" of the compressor surge limiting logic block 104 of FIG. 2 is shown. The compressor surge limiting logic block 104" has several elements in common with the compressor surge limiting logic block 104' of FIG. 3, and like numbers are therefore used to identify like components. A full description of such common components will not be repeated here for brevity. In the embodiment illustrated in FIG. 10, block 104" includes an arithmetic block 300 receiving either $MAF_S$, or if the optional mass flow rate surge limit logic block 156 is included, receiving $MAF_L$ at a subtractive input and receiving the charge flow value, CF, produced by block 100 at an additive input. The output of block 300 is the difference between CF and $MAF_S$ or $MAF_L$, and represents a maximum EGR flow value, $EGRF_{MAX}$, below which turbocharger compressor surge is avoided.

Generally, the mass flow rate of fresh air, $MAF_F$, supplied to the intake manifold 14 via compressor 16 is the difference between the mass flow rate of charge air, CF, supplied to the intake manifold 14 and the mass flow rate of recirculated exhaust gas, EGRF, supplied to the intake manifold 14 via EGR valve 36, or $MAF_F$=CF−EGRF, as described hereinabove. As described with respect to FIG. 4, it is desirable to maintain the mass flow rate of fresh air, $MAF_F$, greater than the mass flow rate surge value, $MAF_S$ or alternatively greater than the mass flow limit, $MAF_L$, both of which are functions of turbocharger speed, in order to avoid turbocharger compressor surge. In terms of the mass flow rate surge value, $MAF_S$, for example, this condition requires $MAF_F$=CF−EGRF>$MAF_S$, or EGRF<CF−$MAF_S$, and in terms of the mass flow limit value, $MAF_L$, for example, this condition requires EGRF<CF−$MAF_L$. The maximum EGR flow value, $EGRF_{MAX}$, below which turbocharger compressor surge is avoided, is therefore defined by the equation $EGRF_{MAX}$=CF−$MAF_S$ (or $MAF_L$), which is the output of arithmetic block 300.

The compressor surge limiting logic block 104" further includes an EGR fraction determination logic block 302 configured to convert the maximum EGR flow rate value, $EGRF_{MAX}$, to a maximum EGR fraction value, $EGRFR_{MAX}$, as a function of the charge flow value, CF, and the maximum EGR flow value, $EGRF_{MAX}$. In the illustrated embodiment, the EGR fraction determination logic block 302 is configured to compute the maximum EGR fraction value, $EGRFR_{MAX}$, as a ratio of CF and $EGRF_{MAX}$; i.e., $EGRFR_{MAX}$=$EGRF_{MAX}$/CF. It is to be understood that the computation of the maximum EGR fraction value, $EGRFR_{MAX}$, as just described represents a simplified approximation of this parameter based on assumptions of constant exhaust gas temperature through the EGR valve 36 and steady state flow of exhaust gas through EGR valve 36, and neglecting effects resulting from variable time delays between the passage of recirculated exhaust gas through EGR valve 36 and arrival of the corresponding EGR fraction in the engine cylinders. Further details relating to strategies for addressing, and including the effects of one or more, such assumptions are described in U.S. Pat. No. 6,837,227, entitled SYSTEM AND METHOD FOR ESTIMATING EGR MASS FLOW AND EGR FRACTION, which is assigned to the assignee of the present invention, and the disclosure of which has been incorporated herein by reference. In any case, the turbocharger speed limiting parameter, TSLP, in the embodiment of block 104" illustrated in FIG. 9, corresponds to the maximum EGR fraction value, $EGRFR_{MAX}$.

Figure 10:
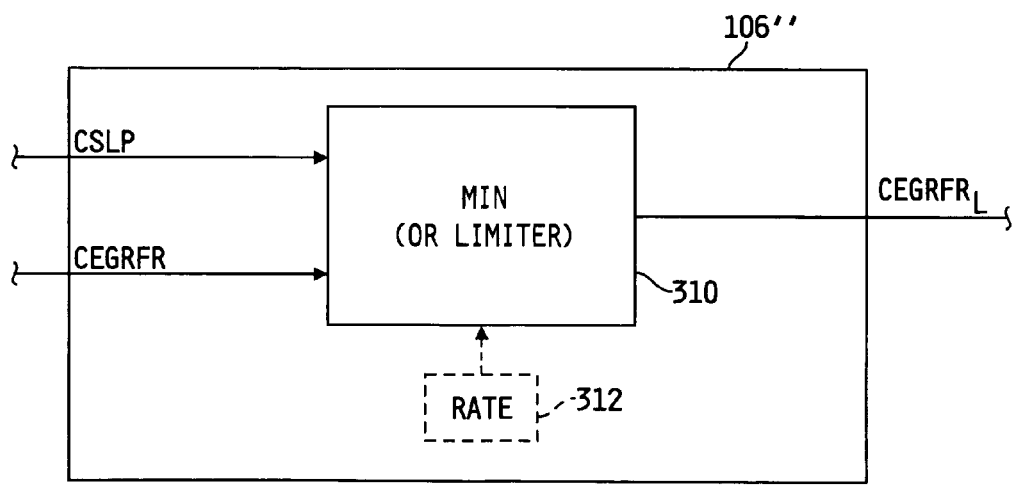
FIG. 10 is a block diagram of another illustrative configuration of the air handling command limiting logic block of FIG. 2 for use with the compressor surge limiting logic block of FIG. 9.

In embodiments of the compressor surge limiting logic block 104" producing the compressor surge limiting parameter, CSLP, as just described, control computer 42 includes the air handling command limiting logic block 106 described hereinabove with respect to FIG. 2. Referring now to FIG. 10, one illustrative embodiment 106" of the air handling command limiting logic block 106 illustrated in FIG. 2, as it relates to the compressor surge limiting logic block 104" of FIG. 10, is shown. In one embodiment, block 106" includes a MIN block 310 receiving as a first the compressor surge limiting parameter, CSLP, which is in this case the maximum EGR fraction value, $EGRFR_{MAX}$, and as a second input the commanded EGR fraction value, CEGRFR. The output of MIN block 310 is the limited EGR fraction command, $CEGRFR_L$, and corresponds to the minimum of the commanded EGR fraction, CEGRFR, and the maximum EGR fraction value, $EGRFR_{MAX}$. In an alternate embodiment, block 310 may be a rate limiter of known construction receiving a rate limiting value, RATE, from block 312. In this embodiment, the rate limiter 312 is operable to limit the commanded EGR fraction, CEGRFR, to the maximum EGR fraction value, $EGRFR_{MAX}$, at a rate defined by the rate limiting value, RATE. In either case, block 310 is operable to limit the commanded EGR fraction, CEGRFR, and produce a correspondingly limited EGR fraction command, CEGRFRL, and the air handling mechanism control logic block 110 is operable to control the position of the EGR valve 36 via a corresponding EGR value control signal, EGRC, that is based on $CEGRFR_L$ to control the position of the EGR valve 36, and/or to control the VGT control signal, so that the flow rate of exhaust gas therethrough is maintained at a flow rate below which turbocharger compressor surge is avoided.

As described hereinabove with respect to FIG. 2, embodiments of the compressor surge limiting logic block 104 are contemplated that may not produce the compressor surge limiting parameter, CSLP, and instead, or in addition to producing CSLP, produce the table axis parameters TAX1 and TAX2. Returning to FIG. 9, the embodiment of the compressor surge limiting logic block 104" illustrated and described may alternatively or additionally provide either $MAF_S$ or $MAF_L$ ($MAF_L$ illustrated by example) as the first table axis parameter, TAX1, and the charge flow value, CF, as the second table axis parameter, TAX2, as shown in phantom. In this embodiment, the EGR valve position limiting logic block 112 may alternatively or additionally limit the EGR valve control signal, EGRC, produced by block 110 to control turbocharger compressor surge.

Referring now to FIG. 12, another illustrative embodiment 112" of the EGR valve position limiting logic block 112 is shown as it relates to the turbocharger surge limiting logic block 104" of FIG. 10. The embodiment 112" illustrated in FIG. 11 will be described as being configured to limit the EGR valve control signal, EGRC, to control turbocharger compressor surge in the absence of the air handling command limiting logic block 106", although it is to be understood that embodiment 112" may alternatively be used in combination with block 106" to augment or enhance the operation of block 106". In any case, the EGR valve position limiting logic block 112" of FIG. 11 includes an EGR valve control signal reduction table 320 receiving as one table axis, e.g., TAX1, the mass flow rate surge value, $MAF_S$, or the mass flow limit, $MAF_L$, ($MAF_L$ shown by example), and as the other table axis, e.g., TAX2, the charge flow value, CF. The mass flow limit values $MAF_{L1}$–$MAF_{LM}$ (or alternatively mass flow rate surge values $MAF_{S1}$–$MAF_{SM}$) define one axis of table 320, and charge flow values $CF_1$–$CF_N$ define the other axis of table 320, and the table 320 is populated with EGR valve control signal reduction values, $RD_{11}$–$RD_{MN}$, wherein "M" and "N" may be any positive integers. Generally, the reduction values $RD_{11}$–$RD_{MN}$ are less than unity, so that subsequent multiplication of the EGR valve control signal, EGRC, by an appropriate one of the RD values by multiplication block 322 produces a limited EGR valve control signal, $EGRC_L$, that results in an appropriate reduction of, or decrease in, the flow of recirculated exhaust gas through the EGR valve 36.

As described hereinabove with respect to FIG. 9, turbocharger compressor surge is avoided as long as the flow rate of recirculated exhaust gas through the EGR valve 36 is maintained below a maximum EGR flow value, $EGRF_{MAX}$, defined as the difference between CF and $MAF_L$ (or $MAF_S$). The reduction values, RD, populating table 320 are accordingly selected as functions of CF and $MAF_L$ (or $MAF_S$) so that the resulting limited EGR valve control signal value, $EGRC_L$, is operable to control the position of the EGR valve 36 so that the flow rate of exhaust gas therethrough is maintained at a flow rate below which turbocharger compressor surge is avoided.

Figure 11:
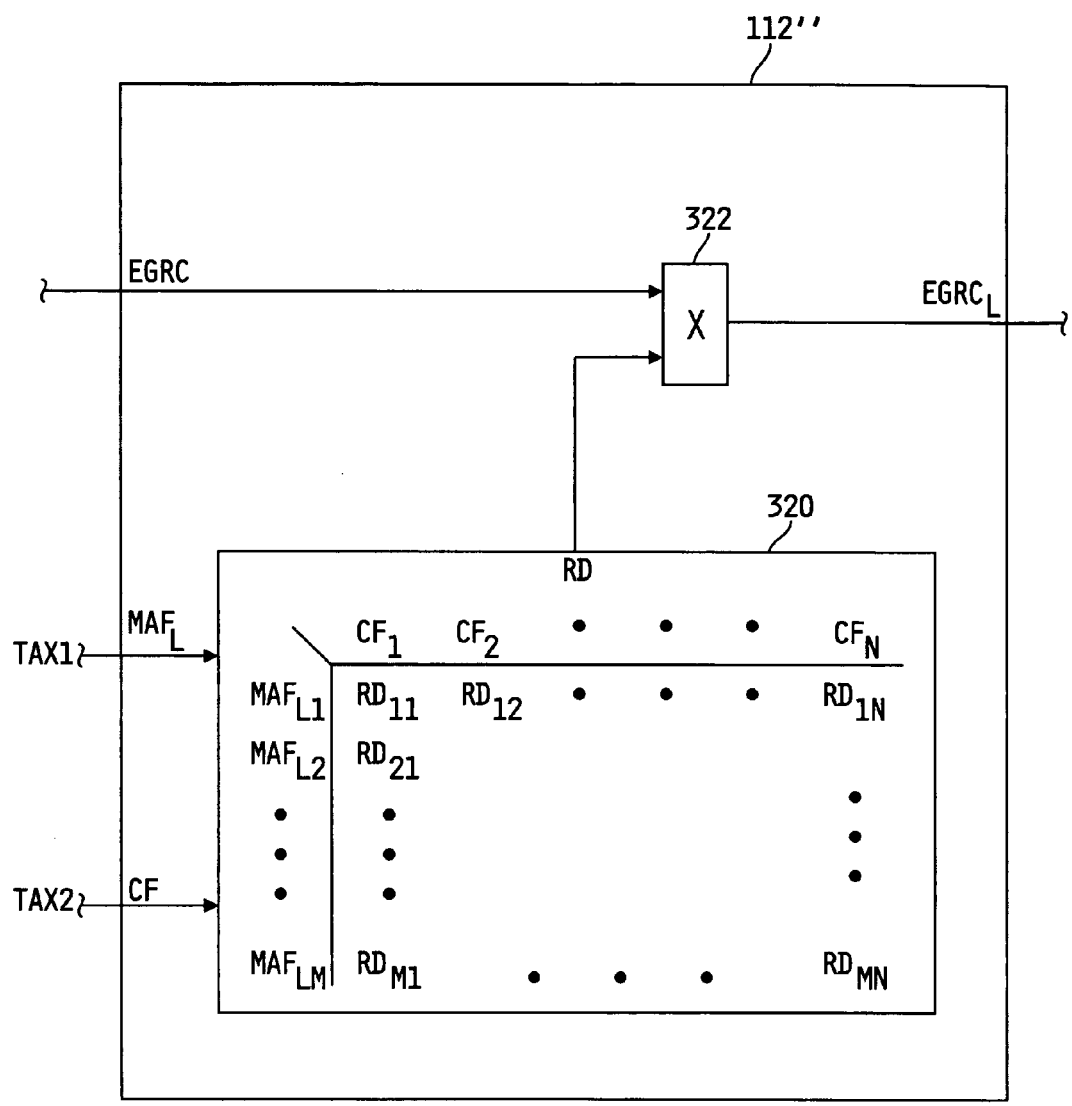
FIG. 11 is a block diagram of another illustrative embodiment of the EGR valve position limiting logic block of FIG. 2 as it relates to the compressor surge limiting logic block embodiment illustrated in FIG. 10.

It will be understood that while the EGR valve position limiting logic block 112" of FIG. 11 is illustrated and described as an open-loop EGR valve control signal limiting strategy, block 112" may alternatively be configured as a closed-loop EGR valve control signal limiting strategy using known techniques well within the knowledge of a skilled artisan. For example, block 112" may be modified to form a closed-loop control strategy by feeding back the EGR position signal, EGRP, computing an error between the limited EGR valve control signal, $EGRC_L$ and the EGR position signal, EGRP, and controlling this error value to zero via a suitable controller of known construction, e.g., using any combination of known proportional, integral and derivative techniques or the like. Any such modifications to block 112" to effectuate closed-loop control of the limited EGR valve control signal, $EGR_L$, would be a mechanical step for a skilled artisan.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, while various counters have been described hereinabove with respect to algorithms 300 and 400 as being incremented, those skilled in the art will recognize that such counters may alternatively be decremented, and any modifications to either of algorithms 300 or 400 to effectuate the alternative counter configurations would be a mechanical step to a skilled artisan.

What is claimed is:

1. System for controlling turbocharger compressor surge, comprising:
    an internal combustion engine having intake and exhaust manifolds;
    a turbocharger including a compressor having an inlet fluidly coupled to ambient and an outlet fluidly coupled to said intake manifold;
    an exhaust gas recirculation (EGR) valve disposed in-line with an EGR conduit fluidly coupled between said intake and exhaust manifolds, said EGR valve responsive to an EGR valve control signal to control exhaust gas flow therethrough;
    means for determining a mass flow parameter corresponding to a mass flow rate of fresh air supplied to said intake manifold;
    a speed sensor producing a speed signal indicative of turbocharger speed; and
    a control computer configured to determine a mass flow rate surge value, corresponding to a fresh air mass flow rate above which turbocharger compressor surge is avoided, as a function of said speed signal, said control computer limiting said EGR valve control signal as a function of said mass flow parameter and said mass flow rate surge value to maintain exhaust gas flow through said EGR valve at a flow rate below which said turbocharger compressor surge is avoided.

2. The system of claim 1 further including a compressor inlet temperature sensor producing a compressor inlet temperature signal indicative of turbocharger compressor inlet temperature,
    and wherein the control computer is configured to determine the said mass flow surge value further as a function of said compressor inlet temperature signal.

3. The system of claim 1 further including a compressor inlet pressure sensor producing a compressor inlet pressure signal indicative of turbocharger compressor inlet pressure,
    and wherein the control computer is configured to determine the said mass flow surge value further as a function of said compressor inlet pressure signal.

4. The system of claim 1 wherein said mass flow parameter corresponds to a mass flow rate of fresh air supplied by said compressor to said intake manifold;
    and wherein said control computer is configured to determine a flow ratio as a ratio of said mass flow rate surge value and said mass flow rate of fresh air, said control computer limiting said EGR valve control signal as a function of said flow ratio.

5. The system of claim 4 further including:
    a compressor inlet temperature sensor producing a compressor inlet temperature signal indicative of turbocharger compressor inlet temperature, and
    a compressor inlet pressure sensor producing a compressor inlet pressure signal indicative of turbocharger compressor inlet pressure,
    wherein the control computer is configured to determine the mass flow parameter as a ratio of a product of the mass flow rate of fresh air and a square root of the compressor inlet temperature signal and the compressor inlet pressure signal.

6. The system of claim 4 wherein said control computer includes:
    means for producing an EGR fraction command corresponding to a desired fraction of recirculated exhaust gas relative to an air charge supplied to said intake manifold, said air charge being a combination of recirculated exhaust gas and fresh air;
    means responsive to said EGR fraction command and said flow ratio to produce a limited EGR fraction command corresponding to an EGR fraction below which turbocharger compressor surge is avoided; and
    means responsive to said limited EGR fraction command to produce said EGR valve control signal.

7. The system of claim 6 wherein said control computer is further configured to determine a mass flow rate surge limit, corresponding to a fresh air mass flow rate greater than said mass flow rate surge value, as a function of said speed signal;
    and wherein said control computer is configured to determine said flow ratio further as a function of said mass flow rate surge limit.

8. The system of claim 7 wherein said control computer is configured to determine a surge limit percentage as a sum of one and a ratio of said mass flow rate surge limit and one hundred;

and wherein said control computer is configured to compute a mass flow rate limit as a product of said mass flow rate surge value and said surge limit percentage, and to determine said flow ratio as a ratio of said mass flow rate limit and of said mass flow of fresh air.

9. The system of claim 4 wherein said control computer includes:
   means for producing an EGR fraction command corresponding to a desired fraction of recirculated exhaust gas relative to an air charge supplied to said intake manifold, said air charge being a combination of recirculated exhaust gas and fresh air;
   means responsive to said EGR fraction command to produce said EGR valve control signal;
   means for determining a charge flow value corresponding to a mass flow rate of said air charge; and
   means for limiting said EGR valve control signal as a function of said flow ratio and of said charge flow value to maintain exhaust gas flow through said EGR valve at said flow rate below which said turbocharger compressor surge is avoided.

10. The system of claim 9 wherein said means for limiting said EGR valve control signal includes:
    means for determining a reduction value as a function of said flow ratio and said charge flow value, said reduction value corresponding to an amount of reduction of said exhaust gas flow through said EGR valve required to maintain exhaust gas flow therethrough at said flow rate below which said turbocharger compressor surge is avoided; and
    means for limiting said EGR valve control signal as a function of said reduction value and said EGR valve control signal only if said flow ratio is greater than or equal to a predefined ration value.

11. The system of claim 9 wherein said control computer is further configured to determine a mass flow rate surge limit, corresponding to a fresh air mass flow rate greater than said mass flow rate surge value, as a function of said speed signal;
    and wherein said control computer is configured to determine said flow ratio further as a function of said mass flow rate surge limit.

12. The system of claim 11 wherein said control computer is configured to determine a surge limit percentage as a sum of one and a ratio of said mass flow rate surge limit and one hundred;
    and wherein said control computer is configured to compute a mass flow rate limit as a product of said mass flow rate surge value and said surge limit percentage, and to determine said flow ratio as a ratio of said mass flow rate limit and of said mass flow of fresh air.

13. The system of claim 1 wherein said mass flow rate parameter is a charge flow value corresponding to a mass flow rate of a combination of fresh air supplied to said intake manifold via said compressor and recirculated exhaust gas supplied to said intake manifold via said EGR valve;
    and wherein said control computer is configured to limit said EGR valve control signal as a function of said mass flow rate surge value and said charge flow value.

14. The system of claim 13 wherein said control computer includes:
    means for producing an EGR fraction command corresponding to a desired fraction of recirculated exhaust gas relative to an air charge supplied to said intake manifold, said air charge being said combination of fresh air and recirculated exhaust gas;
    means for determining a maximum EGR fraction value as a function of said mass flow rate surge value and said charge flow value, said maximum EGR fraction value corresponding to an EGR fraction below which said turbocharger compressor surge s avoided;
    means for producing a limited EGR fraction command as a function of said EGR fraction command and said maximum EGR fraction value; and
    means responsive to said limited EGR fraction command to produce said EGR valve control signal.

15. The system of claim 14 wherein said means for determining a maximum EGR fraction value includes:
    means for computing a maximum EGR flow rate value as said charge flow value less said mass flow rate surge value; and
    means for computing said maximum EGR fraction value as a function of said maximum EGR flow rate value.

16. The system of claim 14 wherein said control computer is further configured to determine a mass flow rate surge limit, corresponding to a fresh air mass flow rate greater than said mass flow rate surge value, as a function of said speed signal;
    and wherein said control computer is configured to determine said flow ratio further as a function of said mass flow rate surge limit.

17. The system of claim 16 wherein said control computer is configured to determine a surge limit percentage as a sum of one and a ratio of said mass flow rate surge limit and one hundred;
    and wherein said control computer is configured to compute a mass flow rate limit as a product of said mass flow rate surge value and said surge limit percentage, and to determine said flow ratio as a ratio of said mass flow rate limit and of said mass flow of fresh air.

18. The system of claim 13 wherein said control computer includes:
    means for determining a reduction value as a function of said mass flow rate surge value and said charge flow value, said reduction value corresponding to an amount of reduction of said exhaust gas flow through said EGR valve required to maintain exhaust gas flow therethrough at said flow rate below which said turbocharger compressor surge is avoided; and
    means for limiting said EGR valve control signal as a function of said reduction value and of said EGR valve control signal.

19. The system of claim 18 wherein said control computer is further configured to determine a mass flow rate surge limit, corresponding to a fresh air mass flow rate greater than said mass flow rate surge value, as a function of said speed signal;
    and wherein said control computer is configured to determine said flow ratio further as a function of said mass flow rate surge limit.

20. The system of claim 19 wherein said control computer is configured to determine a surge limit percentage as a sum of one and a ratio of said mass flow rate surge limit and one hundred;
    and wherein said control computer is configured to compute a mass flow rate limit as a product of said mass flow rate surge value and said surge limit percentage, and to determine said flow ratio as a ratio of said mass flow rate limit and of said mass flow of fresh air.

* * * * *